United States Patent
Sinha et al.

(10) Patent No.: US 6,714,480 B2
(45) Date of Patent: Mar. 30, 2004

(54) DETERMINATION OF ANISOTROPIC MODULI OF EARTH FORMATIONS

(75) Inventors: Bikash K. Sinha, West Redding, CT (US); Colin Michael Sayers, Katy, TX (US); Takeshi Endo, Sagamihara (JP)

(73) Assignee: Schlumberger Technology Corporation, Ridgefield, CT (US)

( * ) Notice: Subject to any disclaimer, the term of this patent is extended or adjusted under 35 U.S.C. 154(b) by 0 days.

(21) Appl. No.: 10/091,657

(22) Filed: Mar. 6, 2002

(65) Prior Publication Data

US 2003/0167835 A1 Sep. 11, 2003

(51) Int. Cl.⁷ .............................. G01V 1/40; G01V 1/28
(52) U.S. Cl. ..................... 367/31; 181/104; 175/40; 175/50; 702/18
(58) Field of Search ................. 367/27, 31; 181/104; 702/6, 14, 18; 175/40, 50; 166/254.2

(56) References Cited

U.S. PATENT DOCUMENTS

| | | | |
|---|---|---|---|
| 5,398,215 A | * 3/1995 | Sinha et al. | 367/31 |
| 5,546,811 A | * 8/1996 | Rogers et al. | 73/800 |
| 5,672,830 A | * 9/1997 | Rogers et al. | 73/597 |
| 6,067,275 A |   5/2000 | Sayers | 367/75 |
| 6,351,991 B1 | * 3/2002 | Sinha | 73/152.01 |
| 6,510,389 B1 | * 1/2003 | Winkler et al. | 702/6 |

FOREIGN PATENT DOCUMENTS

GB   2332947   *   7/1999

OTHER PUBLICATIONS

Carrion, P. et al. "Cross–Borehole Tomography in Anisotropic Media". *Geophysics*, vol. 57, No. 9, pp. 1194–1198, (1992).

Castagna, J. P. et al. "Relationships Between Compressional–Wave and Shear–Wave Velocities in Clastic Silicate Rocks". *Geophysics*, vol. 50, No. 4, pp. 571–581, (1985).

Dellinger, J. et al. "Anelliptic Approximations for TI Media". *J. Seismic Expl.*, vol. 2, pp. 23–40, (1993).

Esmersoy, C. "Dipole Shear Anisotropy Logging". 64th Ann. Internat. Mtg., Soc. Expl. *Geophysics, Expanded Abstracts*, pp. 1139–1142, (1994).

Harrison, A. R. et al. "Acquisition and Analysis of Sonic Waveforms from a Borehole Monopole and Dipole Source for the Determination of Compressional and Shear Speeds and Their Relation to Rock Mechanical Properties and Surface Seismic Data". SPE Annual Tech. Conf. and Exhibition, *Paper SPE 20557*, (Sep. 1990).

Hsu, C. J. et al. "Elastic Waves Through a Simulated Fractured Medium". *Geophysics*, vol. 58, No. 7, pp. 964–977, (1993).

Jones, L. E. A. et al. "Ultrasonic Velocities in Cretaceous Shales from the Williston Basin". *Geophysics*, vol. 46, No. 3, pp. 288–297,(1981).

Kimball, C. V. "Shear Slowness Measurement by Dispersive Processing of the Borehole Flexural Mode". *Geophysics*, vol. 63, No. 2, pp. 337–344 (1998).

(List continued on next page.)

*Primary Examiner*—Nelson Moskowitz
(74) *Attorney, Agent, or Firm*—Martin M. Novack; William B. Batzer; John J. Ryberg

(57) ABSTRACT

A method for determining properties of a transverse isotropic region of earth formations traversed by a wellbore having substantially vertical and deviated sections therethrough, including measuring sonic velocity properties in formations surrounding the substantially vertical section of the wellbore; measuring sonic velocity properties in formations surrounding the deviated section of the wellbore; and determining, from the measured velocities, all of the transverse isotropic elastic constants of the region.

21 Claims, 15 Drawing Sheets

OTHER PUBLICATIONS

Kurkjian, A. L. et al. "Acoustic Multipole Sources in Fluid–filled Boreholes". *Geophysics*, vol. 51, No. 1, pp. 148–163 (1986).

Mueller, M. et al. "Case Studies of the Dipole Shear Anisotropy Log". 64th Ann. Internat. Mtg., Soc. Expl. Geophys., *Expanded Abstracts*, pp. 1143–1146 (1994).

Norris, A. N. et al. "Weak Elastic Anisotropy and the Tube Wave". *Geophysics*, vol. 58, No. 8, pp. 1091–1098 (1993).

Sayers, C. M. "The Elastic Anisotropy of Shales". *J. Geophysics*, vol. 99, No. B1, pp. 767–774, (1994).

Sayers, C. M. "Simplified Anisotropy Parameters for Transversely Isotropic Sedimentary Rocks". *Geophysics*, vol. 60, No. 6, pp. 1933–1935, (1996).

Schmitt, D. P. "Shear Wave Logging in Elastic Formations". *J. Acoust. Soc. Am.*, vol. 84, No. 6, pp. 2215–2229 (1988).

Schoenberg, M. et al. "Introducing ANNIE: A Simple Three–Parameter Anisotropic Velocity Model for Shales". *J. Seis. Expl.*, vol. 5, pp. 35–49, (1996).

Schoenberg, M. "Transversely Isotropic Media Equivalent to Thin Isotropic Layers". *Geophysics Prospecting*, vol. 42, pp. 885–915, (1994).

Schoenberg, M. et al. "Seismic Anisotropy of Fractured Rock". *Geophysics*, vol. 60, No. 1, pp. 204–211 (1995).

Sinha, B. K. "Sensitivity and Inversion of Borehole Flexural Dispersions for Formation Parameters". *Geophysics J. Int.*, vol. 128, No. 1, pp. 84–96 (1997).

Sinha, B. K. et al. "Stress–induced Azimuthal Anisotropy in Borehole Flexural Waves". *Geophysics*, vol. 61, No. 6, pp. 1899–1907 (1996).

Sinha, B. K. et al. "Borehole Flexural Modes in Anisotropic Formations". *Geophysics*, vol. 59, No. 7, pp. 1037–1052 (1994).

Stevens, J. L. et al. "Shear Velocity Logging in Slow Formations Using the Stoneley Wave". *Geophysics*, vol. 51, No. 1, pp. 137–147 (1986).

Tang, X. M. et al. "Borehole Stoneley Wave Propagation Across Permeable Structures". *Geophysical Prospecting*, vol. 41, pp. 165–187 (1993).

Thomsen, L. "Weak Elastic Anisotropy". *Geophysics*, vol. 51, No. 10, pp. 1954–1966 (1986).

Winkler, K. W. et al. "Permeability and Borehole Stoneley Waves: Comparison Between Experiment and Theory". *Geophysics*, vol. 54, No. 1, pp. 66–75 (1989).

Winterstein, D. F. "Anisotropy Effects in *P*–Wave and *SH*–Wave Stacking Velocities Contain Information on Lithology". *Geophysics*, vol. 51, No. 3, pp. 661–672, (1986).

* cited by examiner

TABLE 1

| DEPTH ft | $\rho_f$ kg/m³ | $s_f$ μs/ft | $\rho_s$ kg/m³ | $s_p$ μs/ft | $s_s$ μs/ft |
|---|---|---|---|---|---|
| X+300 | 1198 | 187 | 2563.3 | 57 | 103 |
| X+304 | 1198 | 187 | 2548.1 | 59 | 105 |
| X+336 | 1198 | 187 | 2553 | 60 | 100 |
| X+420 | 1198 | 188 | 2435.5 | 68 | 117 |
| X+478 | 1198 | 193 | 2542.8 | 65.91 | 120.4 |
| X+486 | 1198 | 190 | 2537.8 | 63.14 | 121.7 |

FIG.10

TABLE 2

| DEPTH ft | $s_T$ μs/ft | $c_{44}$ GPa | $c_{55}$ GPa | $c_{55}$ GPa | $c_{44}/c_{55}$ |
|---|---|---|---|---|---|
| X+300 | 200 | 25.8 | 21.6 | 22.1 | 1.2 |
| X+304 | 200 | 25.8 | 21.6 | 22.1 | 1.2 |
| X+336 | 200 | 23.7 | 23.7 | 21.8 | 1.09 |
| X+420 | 205 | 16.5 | 16.2 | 17.1 | 1.04 |
| X+478 | 208 | 23 | 14 | 15.5 | 1.48 |
| X+486 | 209 | 23.6 | 14 | 17.3 | 1.36 |

FIG.11

DETERMINATION OF ANISOTROPIC MODULI OF EARTH FORMATIONS

FIELD OF THE INVENTION

This invention relates to investigation of earth formations and, more particularly, to a method and apparatus for obtaining properties of earth formations using sonic logging and determining anisotropic and shear moduli and related characteristics of the earth formations.

BACKGROUND OF THE INVENTION

It is well known that mechanical disturbances can be used to establish acoustic waves in earth formations surrounding a borehole, and the properties of these waves can be measured to obtain important information about the formations through which the waves have propagated. Parameters of compressional, shear, and Stoneley waves, such as their velocity (or its reciprocal, slowness) in the formation and in the borehole, can be indicators of formation characteristics that help in evaluation of the location and/or producibility of hydrocarbon resources.

An example of a logging device that has been used to obtain and analyze sonic logging measurements of formations surrounding an earth borehole is called a Dipole Shear Sonic Imager ("DSI"-trademark of Schiumberger), and is of the general type described in Harrison et al., "Acquisition and Analysis of Sonic Waveforms From a Borehole Monopole And Dipole Source For The Determination Of Compressional And Shear Speeds And Their Relation To Rock Mechanical Properties And Surface Seismic Data", Society of Petroleum Engineers, SPE 20557, 1990. In conventional use of the DSI logging tool, one can present compressional slowness, $\Delta t_c$, shear slowness, $\Delta t_s$, and Stoneley slowness, $\Delta t_{st}$, each as a function of depth, z. [Slowness is the reciprocal of velocity and corresponds to the interval transit time typically measured by sonic logging tools.]

An acoustic source in a fluid-filled borehole generates headwaves as well as relatively stronger borehole-guided modes. A standard sonic measurement system consists of placing a piezoelectric source and an hydrpohone receivers inside a fluid-filled borehole. The piezoelectric source is configured in the form of either a monopole or a dipole source. The source bandwidth typically ranges from a 0.5 to 20 kHz. A monopole source generates primarily the lowest-order axisymmetric mode, also referred to as the Stoneley mode, together with compressional and shear headwaves. A dipole source primarily excites the lowest-order flexural borehole mode together with compressional and shear headwaves. The headwaves are caused by the coupling of the transmitted acoustic energy to plane waves in the formation that propagate along the borehole axis. An incident compressional wave in the borehole fluid produces critically refracted compressional waves in the formation. Those refracted along the borehole surface are known as compressional headwaves. The critical incidence angle $\theta_i = \sin^{-1}(V_f/V_c)$, where $V_f$ is the compressional wave speed in the borehole fluid; and $V_c$ is the compressional wave speed in the formation. As the compressional headwave travels along the interface, it radiates energy back into the fluid that can be detected by hydrophone receivers placed in the fluid-filled borehole. In fast formations, the shear headwave can be similarly excited by a compressional wave at the critical incidence angle $\theta_i = \sin^{-1}(V_f/V_s)$, where $V_s$ is the shear wave speed in the formation. Headwaves are excited only when the wavelength of the incident wave is smaller than the borehole diameter so that the boundary can be effectively treated as a planar interface. In a homogeneous and isotropic model of fast formations, as above noted, compressional and shear headwaves can be generated by a monopole source placed in a fluid-filled borehole for determining the formation compressional and shear wave speeds. It is known that refracted shear headwaves cannot be detected in slow formations (where the shear wave velocity is less than the borehole-fluid compressional velocity) with receivers placed in the borehole fluid. In slow formations, formation shear velocities are obtained from the low-frequency asymptote of flexural dispersion. There are standard processing techniques for the estimation of formation shear velocities in either fast or slow formations from an array of recorded dipole waveforms.

Both the monopole and dipole waveforms recorded at an array of receivers can be processed by a modified matrix pencil algorithm that isolates non-dispersive and dispersive arrivals in the wave train (Ekstrom, 1995). The compressional headwave velocity is the formation quasi-compressional (qP-) wave velocity along the borehole axis. The low-frequency asymptote of the lowest-order axisymmetric Stoneley dispersion yields the tube wave velocity (VT) along the borehole axis. The formation quasi-shear (qSV-) and shear (SH-) velocities are obtained from the low-frequency asymptotes of the two orthogonally polarized borehole flexural waves propagating along the borehole axis.

Among the areas of interest in the background of the present invention is the field of seismic prospecting. Seismic prospecting for hydrocarbon reserves requires estimates of all the five transversely isotropic (TI-) anisotropic constants of overburden shale for reliable identification and location of target reservoirs. Shale typically constitutes more than 70% of the formation that a borehole trajectory passes through before reaching the target reservoir. Consequently, if the proper anisotropic constants of shale are not accounted for in the velocity model, it is more probable that drilling based on seismic prospecting will miss the target reservoir.

Sedimentary rocks frequently possess an anisotropic structure resulting, for example, from thin bedding, fine scale layering, the presence of oriented microcracks or fractures or the preferred orientation of nonspherical grains or anisotropic minerals. This type of anisotropy is called formation intrinsic anisotropy. A dipole dispersion crossover is an indicator of stress-induced anisotropy dominating any intrinsic anisotropy that may also be present.

Failure to properly account for anisotropy in seismic processing may lead to errors in velocity analysis, normal moveout (NMO) correction, dip moveout (DMO) correction, migration, time-to-depth conversion and amplitude versus offset (AVO) analysis. The main cause of anisotropy in sedimentary basins is the presence of shales which, as noted above, typically form a major component of the basin (Jones et al., 1981), and overlie many hydrocarbon reservoirs. Shales are anisotropic as a result of layering and a partial alignment of plate-like clay minerals (Jones et al., 1981; Sayers, 1994). This anisotropy may be described, to a good approximation, as being transversely isotropic (TI). A TI medium is invariant with respect to rotations about a symmetry axis and may be described by five independent elastic stiffnesses. An example is a sedimentary rock for which the bedding plane is a plane of isotropy.

AVO analysis requires some combinations of formation anisotropic constants. Some of these constants can be obtained from the borehole sonic measurements, others can be obtained from borehole seismic measurements, such as walk-away VSPs. The elastic constants that can be obtained from the borehole sonic measurements are the three formation shear moduli and a compressional modulus from the compressional headwave logging.

It is among the objects of the present invention to provide technique and apparatus for obtaining further information about characteristics of anisotropic formations and more complete and accurate determination of formation attributes.

SUMMARY OF THE INVENTION

Shales in sedimentary basins usually exhibit velocity anisotropy characterized by a TI-symmetry with the symmetry axis in the vertical direction. For dipping beds, the axis may be tilted with respect to the vertical, often to be perpendicular to the sedimentary layering. When the important TI-constants of shale in a basin are known, the quasi-compressional (qP-), quasi-shear (qSV-), and shear (SH-) wave velocities can be calculated as a function of deviation angle from the TI-symmetry axis.

In the prior art, borehole sonic measurements provide estimates of two formation shear moduli in anisotropic formations by a borehole flexural logging probe, such as the above-referenced DSI tool. These shear moduli are in the two sagittal planes passing through the borehole axis and the two orthogonal radial directions. The shear modulus obtained by a monopole source in the refracted shear headwave logging is an azimuthal average of the two formation shear moduli in the sagittal planes. Existing applications of the Stoneley logging that employs a low-frequency monopole source are in the estimation of either formation permeability or fractures intersecting the borehole assuming the formation to be effectively isotropic. A third formation shear modulus in the plane perpendicular to the borehole axis can be obtained from the low-frequency asymptote of the borehole Stoneley dispersion. The Stoneley dispersion can be obtained by processing the monopole waveforms by a somewhat broadband low-frequency source. Together with the two formation shear moduli obtained by the flexural logging probe, this technique provides the three anisotropic shear moduli of the formation by the inversion of DSI/BCR and Stoneley mode acquisitions. The three anisotropic shear moduli can help in indentifying (1) Isotropic formations—characterized by $c_{44}=c_{55}=c_{66}$; (2) VTI formations (TI formations with vertical axis of symmetry)—characterized by $c_{44}=c_{55}\neq c_{66}$ ($X_3$-symmetry axis); (3) HTI formations (TI formations with horizontal axis of symmetry)—characterized by $c_{44}\neq c_{55}=c_{66}$ ($X_1$-symmetry axis); and (3) Orthorhombic formations—characterized by $c_{44}\neq c_{55}\neq c_{66}$. These shear moduli together with associated formation anisotropy are useful indicators of the existing formation fractures, layerings, and relative magnitudes of formation principal stresses. For instance, a VTI formation anisotropy in a vertical wellbore can be an indicator of horizontal fractures and layerings or formation stresses characterized by $S_{Hmax}=S_{hmin}\neq S_V$, where $S_{Hmax}$, $S_{hmin}$, and $S_V$ are the maximum horizontal, minimum horizontal, and vertical stresses. Similarly, a HTI formation anisotropy in a vertical wellbore can be an indicator of vertical fractures and layerings or formation stresses characterized by $S_V=S_{Hmax}\neq S_{hmin}$. An isotropic formation can be an indicator of isotropic formation stresses $S_V=S_{Hmax}=S_{hmin}$. In contrast, an orthorhombic formation can be an indicator of two orthogonal fracture systems or formation stresses characterized by $S_V\neq S_{Hmax}\neq S_{hmin}$. In addition, it can be an indicator of aligned fractures or formation stresses to be obliquely oriented with respect to the borehole axes. The tangential compliance of a fractured formation and stress parameters of a prestressed formation can also be estimated from the three shear moduli. These moduli are also needed in the amplitude versus offset (AVO) analysis of seismic surveys of anisotropic formations.

In accordance with a form of the invention, a method is set forth for determining properties of a transverse isotropic (e.g. shaly) region of earth formations traversed by a wellbore having, substantially vertical and deviated sections therethrough, comprising the following steps: measuring sonic velocity properties in formations surrounding the substantially vertical section of the wellbore; measuring sonic velocity properties in formations surrounding the deviated section of the wellbore; and determining, from the measured velocities in the substantially vertical and deviated sections of the formations, all of the transverse isotropic elastic constants of the formation region. [As used herein the term "transverse isotropic" is intended to include formations that are substantially transverse isotropic.] In an embodiment of this form of the invention, the step of measuring sonic velocity properties in formations surrounding the substantially vertical section of the wellbore includes measuring compressional, shear, and tube wave velocities of the formations. In a further embodiment, the step of measuring sonic velocity properties in formations surrounding the deviated section of the wellbore includes measuring the shear, quasi-shear, and tube wave velocities in formations surrounding the deviated section of the wellbore. Also, an embodiment of the invention further includes the step of determining the azimuth $\phi$ and deviation $\theta$ from the transverse isotropic axis of the wellbore trajectory in the deviated section of the well bore, and the determination of elastic constants of the region is also a function of the azimuth $\phi$ and deviation $\theta$.

In accordance with a further form of the invention, a method is set forth for determining properties of a transverse isotropic (e.g. shaly) region of earth formations traversed by a wellbore having a deviated section therethrough, comprising the following steps: measuring sonic velocity properties in formations surrounding the deviated section of the wellbore; determining the ratio of axial to radial components of polarization associated with quasi-compressional or quasi-shear waves in formations surrounding the deviated section of the wellbore; and determining, from the measured velocities and the determined ratio in the deviated sections of the formations, all of the transverse isotropic elastic constants of the region.

An embodiment of the invention further includes the step of determining the wellbore fluid mass density and compressional velocity, and the determination of elastic constants of the region of formations is also a function of the wellbore fluid mass density and compressional velocity.

In accordance with another form of the invention, a method is set forth for determining properties of a region of earth formations that is transverse isotropic with vertical axis of symmetry, traversed by a wellbore having a substantially deviated section therethrough, comprising the following steps: measuring compressional velocity in formations surrounding the substantially deviated section of wellbore; measuring two orthogonally polarized shear velocities in the formations surrounding the substantially deviated section of wellbore; and determining three elastic parameters of the formations surrounding the substantially deviated section of wellbore.

In accordance with still another form of the invention, a method is set forth for determining properties of a region of earth formations having orthorhombic or monoclinic symmetry with respect to a wellbore traversing the region of formations, comprising the following steps: measuring two orthogonally polarized shear velocities in formations surrounding the wellbore in the region; measuring the tube wave velocity in formations surrounding the wellbore in the region; and determining, from the measured shear velocities and tube wave velocity, three shear moduli referred to the wellbore axis, of the region of formations.

Further features and advantages of the invention will become more readily apparent from the following detailed description when taken in conjunction with the accompanying drawings.

BRIEF DESCRIPTION OF THE DRAWINGS

FIG. 10 is a Table showing estimates of the borehole fluid mass density and compressional and shear slownesses in three different sections of a well.

FIG. 11 is a Table summarizing estimates of three formation shear moduli as a function of depth.

DETAILED DESCRIPTION

Figure 1:
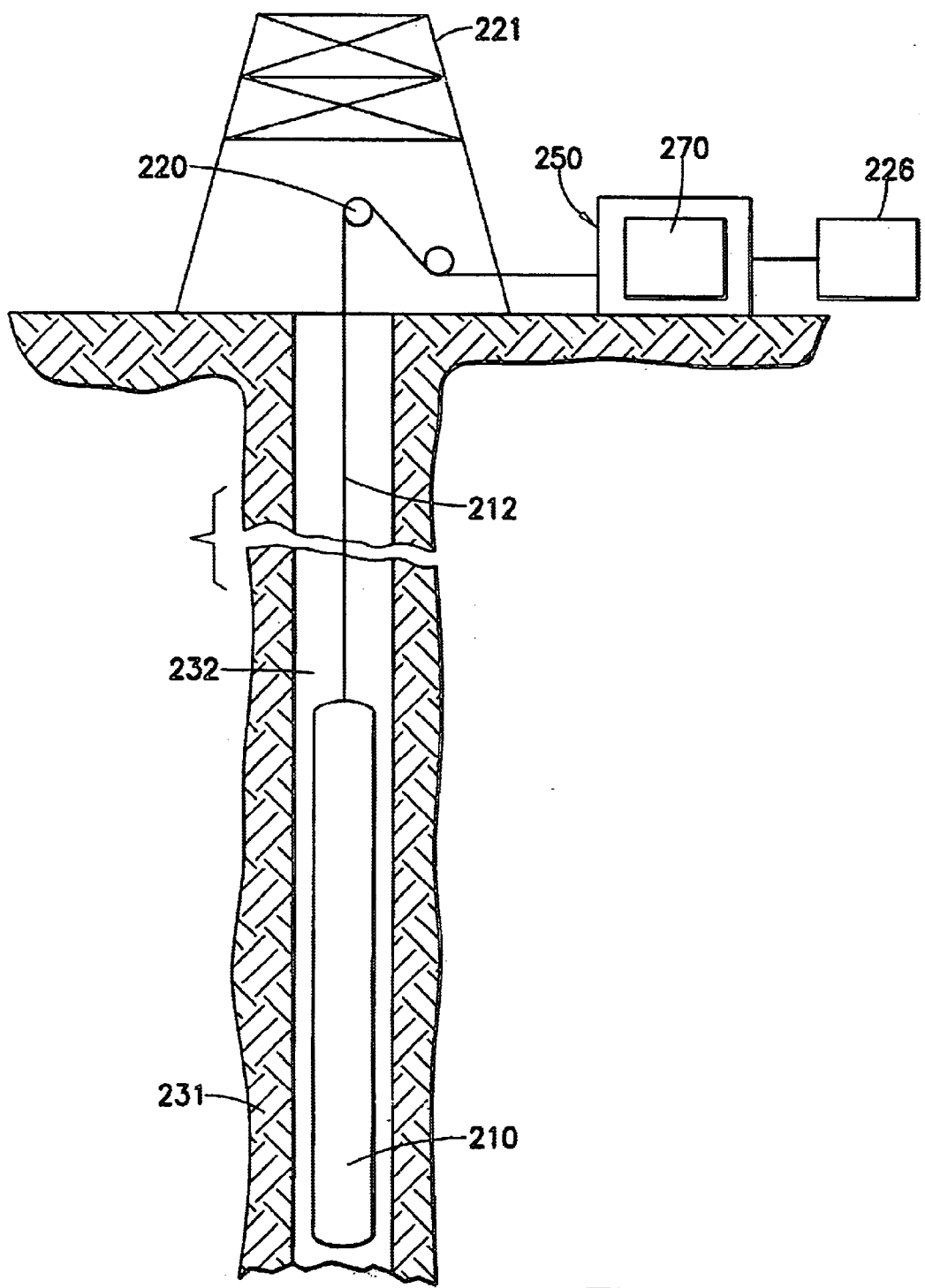
FIG. 1 is a diagram, partially in block form, of a type of apparatus that can be used in practicing embodiments of the invention.

Referring to FIG. 1, there is shown a type of apparatus which can be used in practicing embodiments of the invention. Subsurface formations 231 are traversed by a borehole 232 which is typically, although not necessarily, filled with drilling fluid or mud. A logging tool 210 is suspended on an armored cable 212 and may have optional centralizers (not shown). The cable 212 extends up the borehole, over a sheave wheel 220 on a derrick 221 to a winch forming part of surface equipment 250. Known depth gauging apparatus (not shown) is provided to measure cable displacement over the sheave wheel 220 and accordingly the depth of the logging tool 210 in the borehole 232. A device of a type well known in the art is included in the tool 210 to produce a signal indicative of orientation of the body of the tool 210. Processing and interface circuitry within the tool 210 amplifies, samples and digitizes the tool's information signals for transmission and communicates them to the surface equipment 250 via the cable 212. Electrical power and control signals for coordinating operation of the tool 210 are generated by the surface equipment 250 and communicated via the cable 212 to circuitry provided within the tool 210. The surface equipment includes processor subsystem 270 (which can typically include a microprocessor, memory, clock and timing, and input/output functions—not separately shown), standard peripheral equipment (not separately shown), and recorder 226.

Figure 2:
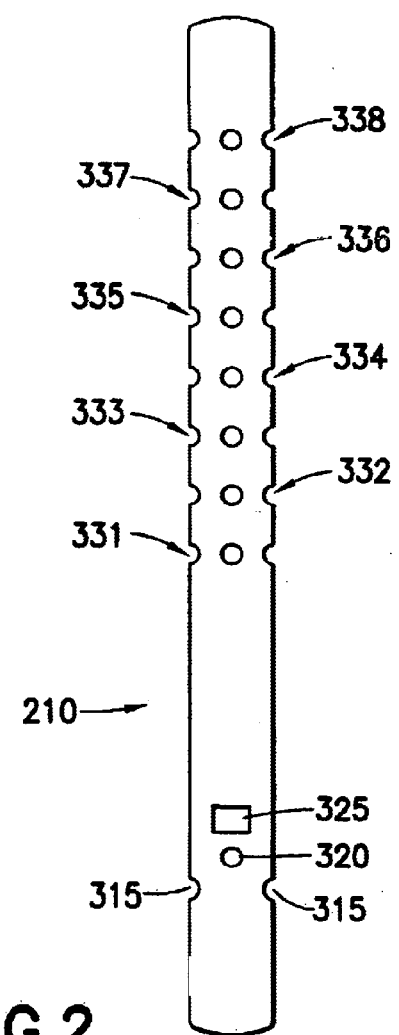
FIG. 2 is a simplified diagram of a type of downhole logging device that can be used in practicing embodiments of the invention.
Figure 3:
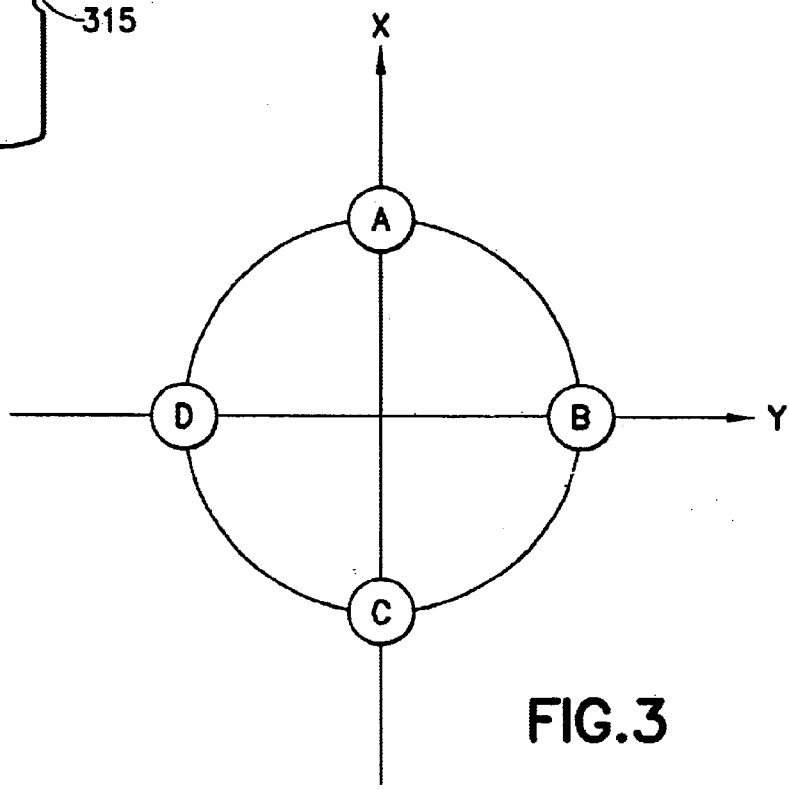
FIG. 3 is a diagram illustrating, in cross-section, the placement of hydrophones that can be used at a receiver station in the logging device of FIG. 3.

The logging device 210 may be, for example, of a type known as a Dipole Shear Sonic Imager ("DSI"—trademark of Schlumberger) generally described in Harrison et al., "Acquisition and Analysis of Sonic Waveforms From a Borehole Monopole and Dipole Source for the Determination of Compressional and Shear Speeds and Their Relation to Rock Mechanical Properties and Surface Seismic Data", Society of Petroleum Engineers, SPE 20557, 1990. It will be understood, however, that any suitable logging device can be utilized. Further details of the logging device 210 of this example are shown in FIG. 2. The logging device 210 includes crossed dipole transmitters 315 and 320 (only one end of dipole 320 being visible) and a monopole transmitter 325, so that waves including compressional, shear, Stoneley, and flexural can be excited. Eight, or other suitable number, of spaced apart receiver stations, designated 331 through 338 each comprise four receiver hydrophones mounted azimuthally at ninety degree intervals in the surface of the cylindrical logging device. FIG. 3 shows the hydrophones, designated A, B, C, and D. In an example shown in FIG. 4, an X component can be obtained by subtracting the signals received at A and C (i.e., A–C), and a Y component can be obtained by subtracting the signals received at B and D (i.e., B–D). With four receiver elements at each receiver station, there are a total of thirty two receiver elements in this example. The receiver stations are also configurable for monopole reception.

The transmitter electronics contain a power amplifier and switching circuitry capable of driving the two crossed-dipole transmitter elements and the monopole element from a programmable waveform. Separate waveforms with appropriate shape and frequency content can be used for dipole, Stoneley and compressional measurements. The receiver electronics processes the signals from the 32 individual receiver elements located at the eight receiver stations which are spaced six inches apart. At each station, four receivers are mounted as shown in FIG. 3 which allows measurement of the dipole and crossed-dipole waveforms by differencing the outputs from opposite receivers, as previously described. Summing the outputs of the receivers can be used to produce a monopole equivalent signal. As further described in Harrison et al., supra, the receiver electronics multiplexers, filters, amplifies and channels the signals from the 32 receiver elements to 8 parallel signal paths. These eight parallel analog signals are passed to an acquisition electronics cartridge where eight 12-bit analog-to-digital converters digitize the signals from the receiver electronics. The telemetry circuitry passes the digitized information to the earth's surface.

Figure 4:
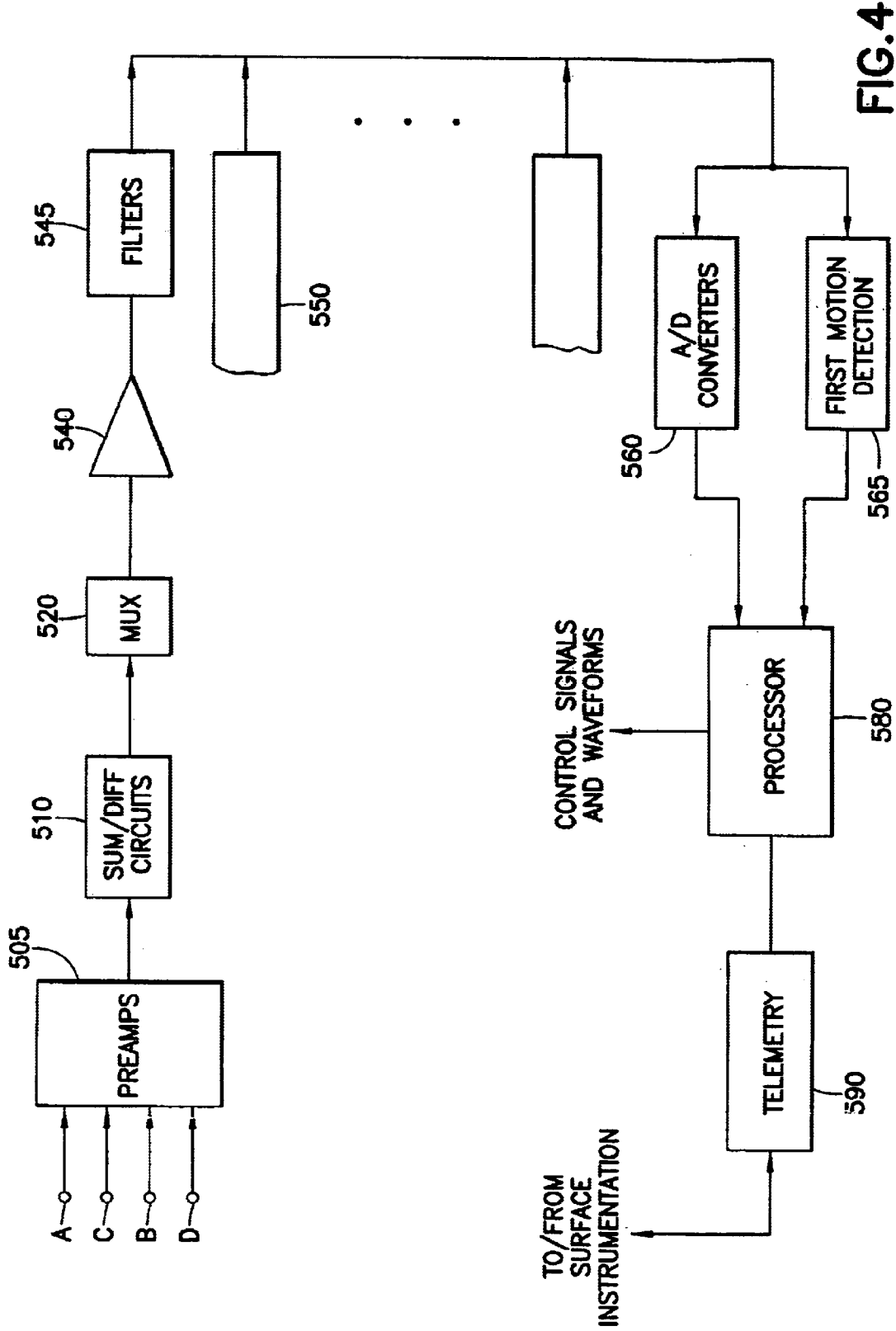
FIG. 4 is a block diagram of a portion of the electronics of the FIG. 2 logging device.

FIG. 4 shows an example of the acquisition signal path in block diagram form for one of the eight (or other suitable number of) receiver stations, as described in Harrison et al., supra. Each receiver has its own charge preamplifier (represented at 505). The output of the receivers, odd numbered pairs being in-line with the upper dipole transmitter and even numbered pairs with the lower dipole transmitter, passes into both a summing circuit (for monopole measurements) and a differencing circuit (for dipole measurements), as represented at 510. Under software control the sum or difference is selected by a multiplexer stage (block 520) and the signal passed to one of eight programmable gain amplifier stages (540) and filters (545). The other similar channels are represented by block 550. The eight parallel analog signals are passed to eight parallel 12-bit A/D converters (represented at 560) where simultaneous waveform digitization is performed. If desired, more bits can, of course, be used to advantage. After digitization, the eight waveforms are passes to the memory section associated with downhole processor 580. The processor also provides control signals and waveforms to transmitter and receiver electronics. An alternate path directs the eight analog receiver signals into threshold crossing detection circuitry or digital first motion detection, as represented at block 565. This circuitry detects the time of all up or down going threshold crossings. The digitized waveform data and the threshold crossing time data are passed to the surface using telemetry circuitry 590. It will be understood that more advanced tool implementations, having additional transmitters, receivers, and/or transmitter-to-receiver (T/R) spacings, and more powerful processing capabilities, can be used even more advantageously, consistent with the principles hereof, in practicing embodiments of the invention.

In the FIG. 2 embodiment, the processing of signals recorded uphole can be implemented using a processor 270, such as a suitably programmed general purpose digital processor with memory and peripherals conventionally provided. It will be understood, however, that the processing need not be performed at the wellsite, and that signals derived at the wellsite can be processed at a remote location. It will also be understood that other suitable logging tools can be employed in practicing the invention.

Consider that special case of a borehole with its axis parallel to the $X_3$-axis of an orthorhombic formation. The elastic constants referred to the borehole axes for an orthorhombic formation takes the form $$C = \begin{bmatrix} c_{11} & c_{12} & c_{13} & 0 & 0 & 0 \\ c_{12} & c_{22} & c_{23} & 0 & 0 & 0 \\ c_{13} & c_{23} & c_{33} & 0 & 0 & 0 \\ 0 & 0 & 0 & c_{44} & 0 & 0 \\ 0 & 0 & 0 & 0 & c_{55} & 0 \\ 0 & 0 & 0 & 0 & 0 & c_{66} \end{bmatrix}, \quad (1)$$

where the 9 independent elastic moduli are $c_{11}$, $c_{12}$, $c_{13}$, $c_{22}$, $c_{23}$, $c_{33}$, $c_{44}$, $c_{55}$, and $c_{66}$.

Figure 5:
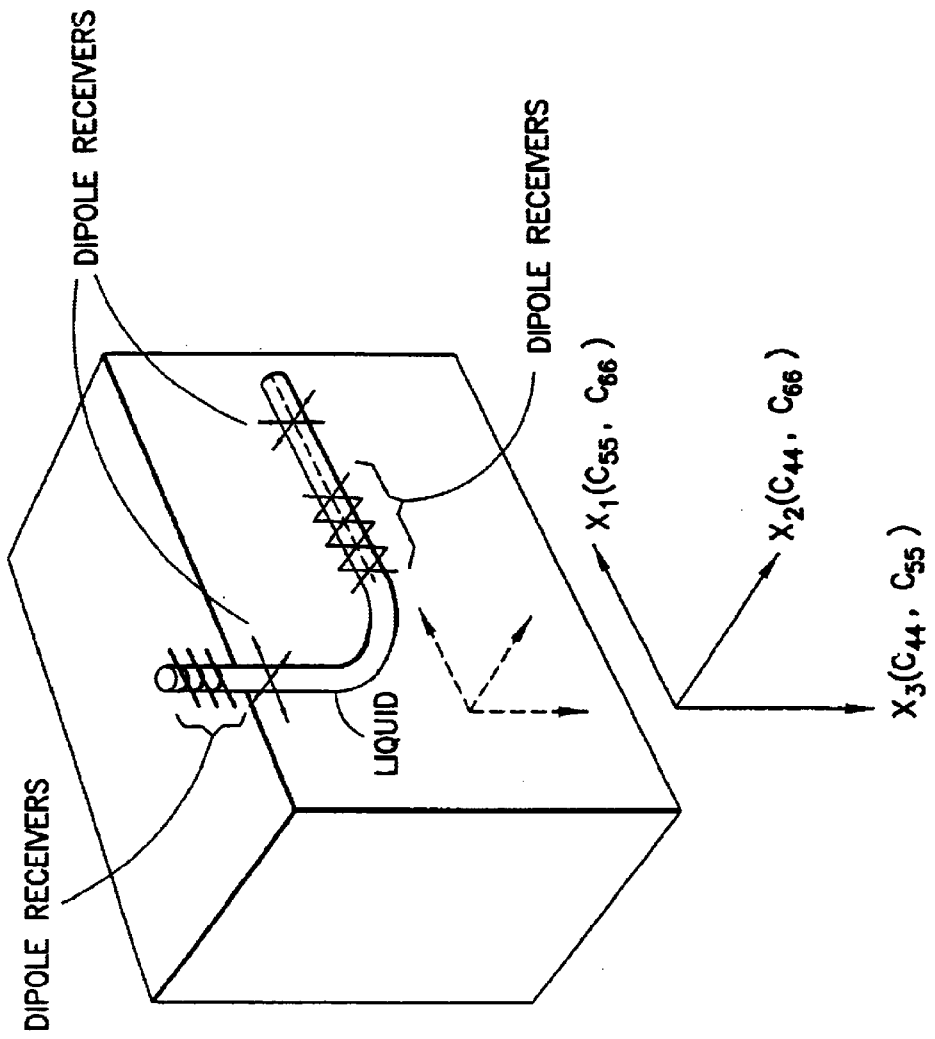
FIG. 5 is a schematic diagram of a vertical and horizontal sections of a well together with the measurement axes. $c_{44}$ and $c_{55}$ are the shear moduli that can be obtained from the dipole shear logging in a borehole with its axis parallel to the $X_3$-axis, whereas the shear modulus $c_{66}$ can be obtained from the monopole Stoneley logging in the same borehole.

FIG. 5 shows a schematic diagram of a vertical well with the $X_3$-axis parallel to the borehole, and a horizontal section of the well with the $X_1$-axis parallel to the borehole. A dipole source in such a borehole can generate two principal flexural waves. Low frequency asymptotes of these two flexural dispersions yield the two shear velocities that provide two of the three shear moduli of the formation. As indicated in FIG. 5, $c_{44}$ and $c_{55}$ are the two shear moduli that can be obtained from the fast and slow dipole flexural dispersions. Note that if the formation were azimuthally isotropic in the $X_1$–$X_2$ plane as is the case with a transversely isotropic (TI) formation with $X_3$-axis parallel to the TI-symmetry axis, then $c_{44}=c_{55}$. However, the third shear modulus $c_{66}$ is different and can be estimated from the tube wave velocity. The tube wave velocity is the zero-frequency asymptote of the borehole Stoneley dispersion. The tube wave velocity $V_T$ is related to the equivalent isotropic modulus $\mu^*$ by the equation $$V_T^2 = V_f^2 \left(1 + \frac{K_f}{\mu^*}\right)^{-1}, \quad (2)$$

where $V_f$ and $K_f$ are the borehole fluid compressional velocity and bulk modulus, respectively. The equivalent isotropic shear modulus $\mu^*$ can be expressed in terms of the following elastic constants of an arbitrarily anisotropic formation $$\mu^* = \frac{1}{8}(c_{11} + c_{22} - 2c_{12} + 4c_{66}), \quad (3)$$

where $c_{11}$, $c_{22}$, $c_{12}$, and $c_{66}$, are the elastic constants of an arbitrarily anisotropic formation and the effective shear modulus $\mu^*$ is the rotationally averaged shear modulus in the plane perpendicular to the $X_3$-axis.

In the horizontal section of the well with the $X_1$-axis parallel to the borehole, the fast and slow dipole flexural dispersions yield the shear moduli $c_{55}$ and $c_{66}$. The tube wave velocity will provide an effective $c_{44}$ that can be obtained from a low-frequency monopole excitation of the Stoneley mode. A similar analysis holds for a horizontal borehole parallel to the $X_2$-axis as shown in FIG. 5. In this case the two borehole flexural modes will yield the shear moduli $c_{44}$ and $c_{66}$, and an effective $c_{55}$ can be obtained from the tube wave velocity.

Next, a parameter model for transversely isotropic shales will be described. The elastic stiffness tensor of a TI medium is invariant with respect to rotations about a symmetry axis and may be described by five independent elastic stiffnesses. If the axis of rotational symmetry is chosen to lie along $x_3$, the non-vanishing density-normalized elastic stiffness $a_{ij}$ are $a_{11}=a_{22}$, $a_{33}$, $a_{12}$, $a_{13}=a_{23}$, $a_{44}=a_{55}$ and $a_{66}=(a_{11}-a_{12})/2$. In terms of the $a_{ij}$, the vertical velocity, $v_V(P)$, the horizontal velocity $v_H(P)$, and the NMO velocity, $v_{NMO}(P)$, for P-waves and the corresponding quantities $v_V(SV)$, $v_H(SV)$ and $v_{NMO}(SV)$ for SV-waves are given by $$v_V^2(P) = a_{33}, \quad (4)$$

$$v_H^2(P) = a_{11}, \quad (5)$$

$$v_{NMO}^2(P) = a_{55} + (a_{13}+a_{55})^2/(a_{33}-a_{55}), \quad (6)$$

$$v_V^2(SV) = v_H^2(SV) = a_{55}, \quad (7)$$

$$v_{NMO}^2(SV) = a_{11} - (a_{13}+a_{55})^2/(a_{33}-a_{55}) \quad (8)$$

(Thomsen, 1986; Dellinger et al., 1993). Although a TI medium is described by five independent elastic stiffnesses, it is not possible to obtain all of these from P- and S-wave velocities measured in a deviated well. In a deviated well, a sonic tool in the borehole can be used to provide the qP phase velocity at the angle of the borehole relative to the symmetry axis of the TI medium. Cross-dipole shear measurements provide, in addition, the phase velocities of qSV and SH-waves after the application of Alford rotation. Schoenberg et al. (1996) suggested a simple three parameter transversely isotropic model (ANNIE) as a reasonable first approximation for the elastic behavior of a variety of shales. These three parameters can be determined using P- and S-wave velocities measured in a deviated well.

The non-vanishing density-normalized elastic stiffnesses $a_{ij}$ for ANNIE are $a_{11}=a_{22}=\lambda 2\mu_H$, $a_{33}=\lambda+2\mu$, $a_{12}=a_{13}=a_{23}=\lambda$, $a_{44}=a_{55}=\mu$ and $a_{66}=(a_{11}-a_{12})/2=\mu_H$. The density-normalized elastic ANNIE therefore takes the form (Schoenberg et al., 1996)

$$a = \begin{bmatrix} \lambda+2\mu_H & \lambda & \lambda & 0 & 0 & 0 \\ \lambda & \lambda+2\mu_H & \lambda & 0 & 0 & 0 \\ \lambda & \lambda & \lambda+2\mu & 0 & 0 & 0 \\ 0 & 0 & 0 & \mu & 0 & 0 \\ 0 & 0 & 0 & 0 & \mu & 0 \\ 0 & 0 & 0 & 0 & 0 & \mu_H \end{bmatrix} \quad (9)$$

where $\lambda$, $\mu$ and $\mu_H$ are the three parameters of the model. As this is a three parameter model for transverse isotropy, there are two constraints, in the form of strict equalities, on the set of five ordinarily independent TI parameters (Schoenberg et al., 1996). These constraints are $$a_{13}+2a_{55}-a_{33}=0, \quad (10)$$

$$a_{12}=a_{13}. \quad (11)$$

The first constraint is motivated by the fact that while depths calculated from S-wave stacking velocities almost always exceed actual depths, sometimes by as much as 25%, depths calculated from P-wave stacking velocities are almost always within 10% of actual depths (Winterstein, 1986), and often much closer. It is because of this that isotropic analysis has been very successful for the seismic industry, as long as the total angular aperture has been relatively small (Winterstein, 1986). The NMO velocity for P-waves can be written in terms of the vertical P-wave velocity as $$v_{NMO}(P)=v_V(P)\sqrt{1+2\delta}, \quad (12)$$

where $$\delta = \frac{(a_{13}+a_{55})^2 - (a_{33}-a_{55})^2}{2a_{33}(a_{33}-a_{55})} \quad (13)$$

(Thomsen, 1986). $\delta$ may be written as $$\delta = \chi + \frac{\chi^2}{2(1-a_{55}/a_{33})}, \quad (14)$$

where $$\chi = \frac{(a_{13}+2a_{55}-a_{33})}{a_{33}}. \quad (15)$$

(Sayers, 1996). The first constraint is therefore equivalent to the vanishing of Thomsen's $\Gamma$ parameter. The second constraint is also observed to be approximately true in many shales, and does not affect PSV wave propagation since $a_{12}$ only influences the propagation of SH-waves.

Figure 6:
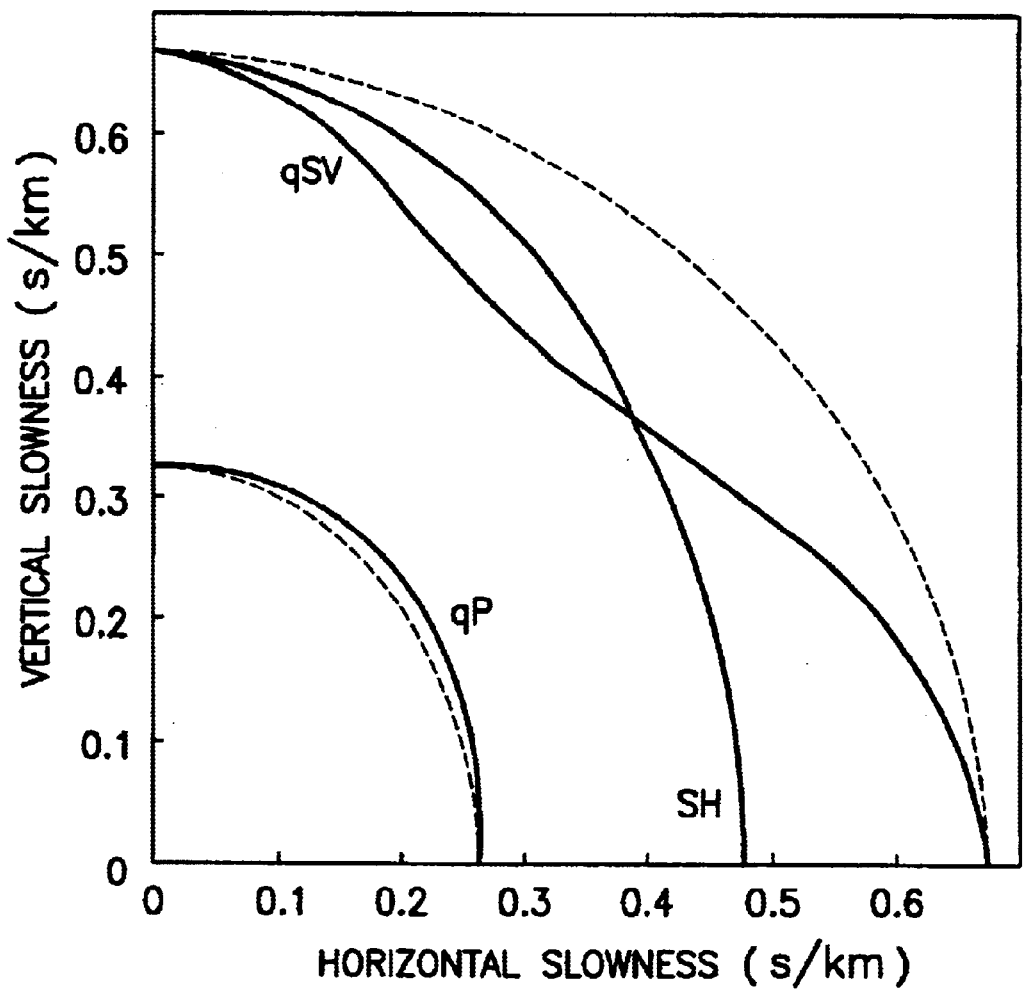
FIG. 6 shows 2 phase slowness curves for Greenhorn shale computed using the elastic stiffnesses measured at a confining pressure of 0.1 MPa. The dotted curves show the phase slowness curves for an elliptically anisotropy medium having the same axial compressional and shear velocities.

These constraints are motivated by the characteristic shape of the phase-slowness surface for shales (Carrion et al., Dellinger et al., 1993; Sayers, 1994; Schoenberg, 1994), an example being the phase slowness surface for Greenhorn shale (Jones et al., 1981), which is compared in FIG. 6 with an elliptically anisotropic medium having the same axial P and S velocities. The phase slowness is simply the inverse of phase velocity. The horizontal P slowness $\sqrt{1/a_{11}}$ is seen to be smaller than the vertical P slowness $\sqrt{1/a_{33}}$. The qP-wave slowness curve bulges out from the ellipse connecting the vertical and horizontal P slownesses. This is called 'positive anellipticity', and implies that for oblique directions the medium is slower (for qP-waves) than an elliptical medium with the same values of $a_{11}$ and $a_{33}$. Positive anellipticity also implies that the qSV-phase slowness curve is pushed inwards from the circle that connects its horizontal and vertical slownesses, both of which are equal to $\sqrt{1/a_{55}}$. Often, this contraction between horizontal and vertical is enough for the qSV curve to have a concavity about an oblique direction corresponding to a triplication in the wavefront, or group velocity curve.

Consider the case of a transversely isotropic (TI-) formation with the $X_3$-axis parallel to the symmetry axis. The elastic constants referred to the TI-axis takes the form $$C = \begin{bmatrix} c_{11} & c_{12} & c_{13} & 0 & 0 & 0 \\ c_{12} & c_{11} & c_{13} & 0 & 0 & 0 \\ c_{13} & c_{13} & c_{33} & 0 & 0 & 0 \\ 0 & 0 & 0 & c_{44} & 0 & 0 \\ 0 & 0 & 0 & 0 & c_{44} & 0 \\ 0 & 0 & 0 & 0 & 0 & c_{66} \end{bmatrix}, \quad (16)$$

where 5 independent elastic moduli are $C_{11}$, $C_{12}$, $C_{13}$, $C_{33}$, and $C_{44}$. $C_{66}=(C_{11}-C_{12})/2$.

Next, for a deviated borehole in a TI formation, estimation of five TI-constants from velocities and amplitude ratios is treated. Four velocities can be obtained from measurements in a deviated well: (a) Formation compressional velocity $V_P$ from a monopole source; (b) Tube wave velocity $V_T$ from a low-frequency Stoneley dispersion; (c) Shear-horizontal (SH) wave velocity $V_{SH}$ from the low-frequency extrapolation of SH-polarized flexural wave dispersion; and (d) Shear-vertical (SV) wave velocity VSv from the low-frequency extrapolation of SV-polarized flexural wave dispersion. In addition to these four velocity equations, the components of the polarization vector associated with either the quasi-compressional or quasi-shear waves propagating along the deviated well can be measured. In a deviated well, the ratios of longitudinal to transverse components of the polarization vectors for the qP and qSV waves are negative reciprocals of one another. Each of these ratios is related to a combination of TI elastic constants. The components of polarization vectors can be measured with respect to the borehole axes with three-axes geophones mounted on the borehole surface.

When referred to the TI-anisotropy axes with the propagation direction parallel to borehole axis $X_3$ inclined at an angle 0 with respect to the TI-symmetry axis, the velocity of the SH-wave is given by $$\rho V_{SH}^2 = c_{44}\cos^2\theta c_{66}\sin^2\theta, \quad (17)$$

$$\rho V_P^2 = \frac{1}{2}[Q_{11}+Q_{33}+\sqrt{(Q_{11}-Q_{33})^2+4Q_{13}^2}], \quad (18)$$

$$\rho V_{SV}^2 = \frac{1}{2}[Q_{11} + Q_{33} - \sqrt{(Q_{11} - Q_{33})^2 + 4Q_{13}^2}], \quad (19)$$

where $$Q_{11} = c_{11}\sin^2\theta + c_{55}\cos^2\theta, \quad (20)$$

$$Q_{33} = c_{55}\sin^2\theta + c_{33}\cos^2\theta, \quad (21)$$

$$Q_{13} = (c_{13} + c_{55})\sin\theta\cos\theta. \quad (22)$$

The solution of Christoffel's equations yields the following expressions for the ratio of the transverse to longitudinal component of the particle motion for the qP-wave along the borehole axis $$\frac{a_1}{a_3} = \frac{-(c_{13} + c_{55})\sin 2\theta}{Q_{11} - Q_{33} + \sqrt{(Q_{11} - Q_{33}^2) + 4Q_{13}^2}}, \quad (23)$$

and the ratio of the longitudinal to transverse component of the particle motion for the qSV-wave along the borehole axis assumes the form which is negative of $a_1/a_3$ for the qP-wave as given by equation (23)

$$\frac{a_3}{a_1} = \frac{(c_{13} + c_{55})\sin 2\theta}{Q_{11} - Q_{33} + \sqrt{(Q_{11} - Q_{33}^2) + 4Q_{13}^2}}. \quad (24)$$

Note that the amplitude components $a_1$ and $a_3$ are with respect to the TI principal axes. The components of the particle motion $a'_1$ and $a'_3$, measured with a three-component geophone mounted on the borehole surface are with respect to the borehole axes. The measured amplitude components $a_1$ and $a_3$ in the borehole coordinate system are related to the $a_1$ and $a_3$ in the TI coordinate system by the following transformations $$a_1 = \cos\theta a'_1 + \sin\theta a'_3, \quad (25)$$

$$a_3 = \cos\theta a'_3 - \sin\theta a'_1, \quad (26)$$

The tube wave is the quasi-static or the low-frequency equivalent of the azimuthally symmetric Stoneley wave in a borehole. The tube wave velocity in the presence of weakly anisotropic formations can be expressed in terms of an effective shear modulus for an equivalent isotropic formation. When the elastic constants are referred to the borehole coordinate system, the effective shear modulus can be expressed as $$\mu^* = \frac{1}{8}(c'_{11} + c'_{22} - 2c'_{12} + 4c'_{66}). \quad (27)$$

where $$c'_{11} = c_{11}\cos^4\theta + 2c_{13}\sin^2\theta\cos^2\theta + c_{44}\sin^2 2\theta, \quad (28)$$

$$c'_{22} = c_{11}, \quad (29)$$

$$c'_{12} = c_{12}\cos^2\theta + c_{13}\sin^2\theta, \quad (30)$$

$$c'_{66} = c_{44}\sin^2\theta + c_{66}\cos^2\theta, \quad (31)$$

where the primed $c_{ij}$ denotes the rotated elastic constant referred to the borehole coordinate system, and the unprimed $c_{ij}$ is the elastic constant referred to the TI-anisotropy axes.

The effective shear modulus for $\mu^*$ for an equivalent isotropic formation can be expressed in terms of the fundamental TI-constants and the deviation of the borehole from the TI-symmetry axis. The resulting expression takes the form $$\mu^* = c_{44}\sin^2\theta + c_{66}\cos^2\theta + \frac{1}{8}N\sin^4\theta, \quad (32)$$

$$N = c_{11} + c_{33} - 2c_{33} - 4c_{44}. \quad (33)$$

and the tube wave velocity in a deviated borehole is then given by $$V_T = V_f\left(1 + \frac{K_f}{\mu^*}\right)^{-\frac{1}{2}}, \quad (34)$$

where $V_T$, $V_f$, and $K_f$, respectively, are the tube wave velocity, compressional velocity in the borehole fluid, and the fluid compressional modulus.

If the borehole makes an angle $\theta$ with respect to the TI-symmetry axis, the compressional headwave velocity $V_p$, the fast shear velocity $V_{SH}$, and the slow shear velocity $V_{SV}$ can be given by the following equations (Norris and Sinha, 1993)

$$\rho V_P^2 = c_{33}(1-\sin^4\theta) + c_{11}\sin^4\theta + (2c_{13} + 4c_{44} - 2c_{33})\sin^2\theta\cos^2\theta, \quad (35)$$

$$\rho V_{SH}^2 = c_{44}(1-\sin^2\theta) + c_{66}\sin^2\theta, \quad (36)$$

$$\rho V_{SV}^2 = c_{44} + (c_{11} + c_{33} - 2c_{13} - 4c_{44})\sin^2\theta\cos^2\theta. \quad (37)$$

[In setting forth equations that describe an exemplary embodiment hereof, an assumption of weak anisotropy is made, although it will be understood that the invention has wider application, for example to highly anisotropic formations.] The effective shear modulus $\mu^*(\theta)$ in the case of a deviated borehole with respect to the Ti-symmetry axis can be expressed as $$\mu^*(\theta) = c_{44}\sin^2\theta + c_{66}\cos^2\theta + \frac{1}{8}(c_{11} + c_{33} - 2c_{13} - 4c_{44})\sin^4\theta. \quad (38)$$

where $$\mu^*(\theta) = \frac{V_T^2 \rho_f V_f^2}{V_f^2 - V_T^2}. \quad (39)$$

and $\rho_f$ is the borehole mud mass density; $V_T$, and $V_f$ are the tube wave and mud compressional velocities, respectively.

Figure 7:
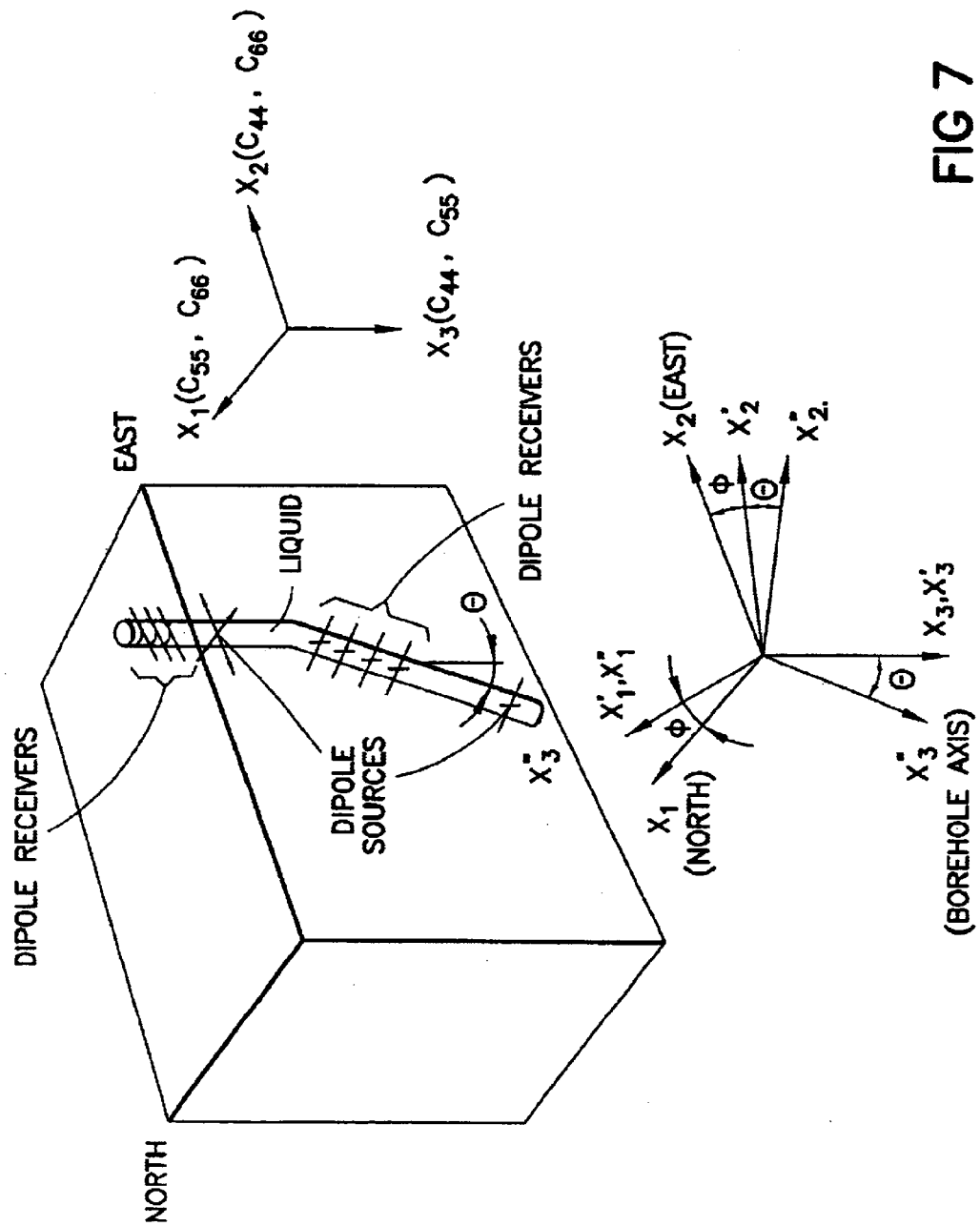
FIG. 7 is a schematic diagram of a vertical and deviated sections of a well together with the measurement axes, $c_{44}$ and $c_{55}$ are the shear moduli that can be obtained from the dipole shear logging in a borehole with its axis parallel to the $X_3$-axis, whereas the shear modulus $c_{66}$ can be obtained from the monopole Stoneley logging in the same borehole.

The obtainment of TI-constants from borehole measurements in vertical and deviated sections in shales will now be treated. FIG. 7 shows a schematic diagram of vertical and deviated sections of a well together with the measurement axes. The five TI-constants of shale can be estimated from sonic velocities in a vertical and deviated sections of wellbore in a reasonably uniform lithology. The steps are set forth as follows:

Step 1: Measure the formation compressional, shear, and tube-wave ($V_T$) velocities in the vertical section of the well and estimate the elastic constants $c_{33}$, $c_{44}$, and $c_{66}$ from the following equations $$c_{33} = \rho V_{33}^2, \quad (40)$$

$$c_{44} = \rho V_{32}^2, \quad (41)$$

$$c_{66} = \frac{V_T^2 \rho_f V_f^2}{V_f^2 - V_T^2}. \quad (42)$$

Step 2: Measure the azimuth φ and deviation θ from the vertical TI-symmetry axis of the well trajectory from a standard tool, such as Then measure the formation compressional (qV-), quasi-shear (qSV-), shear (SH-), and tube-wave ($V_T$) velocities along the wellbore trajectory, and estimate the borehole fluid mass density ($\rho_f$) and compressional velocity ($V_f$).

Step 3: Measure the formation compressional, shear, and tube-wave ($V_T$) velocities in the deviation section of the well with a reasonably uniform deviation angle θ, and estimate the anisotropic parameter N from the following equation $$N = 8 \frac{(\mu^* - c_{44}\sin^2\theta - c_{66}\cos^2\theta)}{\sin^4\theta} \quad (43)$$

where $$N = c_{11} + c_{33} - 2c_{13} - 4c_{44}. \quad (44)$$

Step 4: Calculate the remaining two TI-constants $c_{11}$ and $c_{13}$ from the relations:

$$AX = B, \quad (45)$$

where $$A = \begin{bmatrix} \sin^4\theta & \frac{1}{2}\sin^2 2\theta \\ 1 & -2 \end{bmatrix},$$

and $$B = [\rho V_P^2 - _{33}(1 - \sin^4\theta) - 2(2c_{44} - c_{33})\sin^2\theta \cos^2\theta, N - c_{33} + 4c_{44}], (46)$$

$$X = [c_{11}, c_{13}]. \quad (47)$$

If the borehole measurements of four sonic velocities are obtained only from a deviated section of the well, $c_{44}$, $c_{66}$, and two other combinations of anisotropic constants can be estimated. This technique can employ the following steps:

STEP 1: Measure the azimuth φ and deviation θ from the vertical TI-symmetry axis of the well trajectory from a standard tool, such as that first described above.

Step 2: Measure the formation compressional (qV-) quasi-shear (qSV-), shear (SH-), and tube-wave ($V_T$) velocities along the well bore trajectory. Estimate the borehole fluid mass density ($\rho_f$) and compressional velocity ($V_f$) in the deviated section of the well. Estimate the elastic constants $c_{44}$, $c_{66}$, and the anisotropic parameter N from the following equations $$CY = D, \quad (48)$$

Where $$C = \begin{bmatrix} 1 & \cos^2\theta & \frac{1}{4}\sin^2\theta \\ 1 & 0 & 2\cos^2\theta \\ 1 & \sin^2\theta & 0 \end{bmatrix},$$

and $$D = [\mu^*, \rho v_{qSV}^2, \rho V_{SH}^2], \quad (49)$$

$$\mu^* = \frac{\rho_f V_f^2}{(V_f^2/V_T^2 - 1)}. \quad (50)$$

The elements of the unknown vector are given by $$Y = [c_{44}, (c_{66} - c_{44}), 0.5N\sin^2\theta], \quad (51)$$

$$N = c_{11} + c_{33} - 2c_{13} - 4c_{44}. \quad (52)$$

Step 3: After the anisotropic parameter N has been determined in step 2, The following relationship between $c_{11}$ and $c_{33}$ can be computed using the measured quasicompressional velocity ($V_p$)

$$c_{11}\sin^2\theta + c_{33}\cos^2\theta = \rho V_P^2 + N\sin^2\theta\cos^2\theta. \quad (53)$$

If the borehole measurements of only three sonic velocities are obtained from a deviated section of the well, the three parameters λ, μ, and $\mu_H$ of a TI-medium with vertical axis of symmetry can be estimated. The following steps can be employed:

An initial estimate of the P-wave velocity is first determined from the measured P-wave velocity in the deviated well, and the 'mudrock line' of Castagna et al. (1985) or some other empirical relation between $v_p$ and $v_s$ is used to make an initial estimate of the S-wave velocity. These estimates can then be refined using the following steps:

Step 1: Estimate initial isotropic P-wave velocity $v_p$, from the sonic velocity measured at the well deviation angle. Depths predicted using stacking velocities for PP reflections are almost always within 10% of actual depths (Winterstein, 1986) and often much closer. It is because of this that isotropic analysis has been very successful for the seismic industry, as long as the total angular aperture has been relatively small.

Step 2: Having estimated an initial isotropic P-wave velocity, an initial isotropic S-wave velocity can be estimated using the 'mudrock-line" of Castagana et al. (1985) which gives the following relation between $v_p$ and $v_s$: $v_s = 0.8621 v_p - 1.1724$. Alternatively, any other convenient correlation between $v_p$ and $v_s$ may be used.

Step 3: Calculate initial estimate $\mu = \mu_H = v_s^2$, $\lambda = v_p^2 - 2v_s^2$ Step 4: Using a three-dimensional search centered on these initial estimates, find the values of λ, μ and $\mu_H$ that minimize the quantity $$\chi^2 = \frac{1}{\pi} \sum_{i=1}^{\pi} \left( \frac{v_i^{measured} - v_i^{predicted}}{\sigma^i} \right)^2,$$

where n=3, $v_i^{measured}$ is the measured phase velocity for the ith mode and $v_i^{predicted}$ is the value predicted using equation (9). $\sigma_i$ is the standard deviation for the ith mode.

Step 5: Estimate all the $a_{ij}$ using equation (9).

Step 6: Estimate vertical P- and S-wave velocities using

Step 7: Use any additional information to refine the $a_{ij}$ estimates using perturbation theory. Examples of suitable information include measurements of the Stoneley velocity, velocity measurements in nearby wells with different deviations, checkshot velocities, slownesses determined from walkaway VSPs and anisotropy parameters obtained from surface seismic.

A procedure for estimating the three shear moduli in an orthorhombic formation employs the following steps:

Step 1: Measure the fast ($V_{Fast}$) and slow ($V_{Slow}$) shear velocities of the formation with a dipole sonic tool in a vertical well in a chosen depth interval with a reasonably uniform lithology.

Step 2: Estimate the formation mass density ($\rho_s$) from a standard neutron density tool in the same depth interval.

Step 3: The two shear moduli in the orthogonal sagittal planes of the measurement are computed from the relations $$C_{44} = \rho_s V_{Fast}^2, \quad (54)$$

$$C_{55} = \rho_s V_{Slow}^2. \quad (55)$$

Step 4: Estimate the borehole fluid mass density ($\rho_f$) from the drilling mud weight.

Step 5: Estimate the borehole fluid compressional velocity ($V_f$) from the mud composition used during drilling or any other standard technique in the chosen depth interval.

Step 6: Estimate the tube wave velocity ($V_T$) from the zero frequency asymptote of the Stoneley dispersion. The Stoneley dispersion is obtained from the processing of monopole waveform at an array of receivers by a modified matrix pencil algorithm (Ekstrom, 1995).

Step 7: Compute the third shear modulus $C_{66}$ in the chosen depth interval from the following equation $$C_{66} = \frac{\rho_f V_f^2}{(V_f^2/V_T^2 - 1)} \quad (56)$$

where the borehole fluid mass density $\rho_f$ is obtained from step 4; the borehole fluid compressional velocity $V_f$ is obtained from step 5; and the tube wave velocity $V_T$ is obtained from step 6.

As an example, consider a vertical borehole parallel to the $X_3$-axis. For simplicity, assume that the formation exhibits orthorhombic symmetry with respect to the measurement axes. The dipole flexural logging in the BCR mode provides the fast ($V_{Fast}$) and slow ($V_{Slow}$) shear velocities of the formation. The two shear moduli in the orthogonal sagittal planes of the measurement can be obtained from equations (54) and (55).

Figure 8:
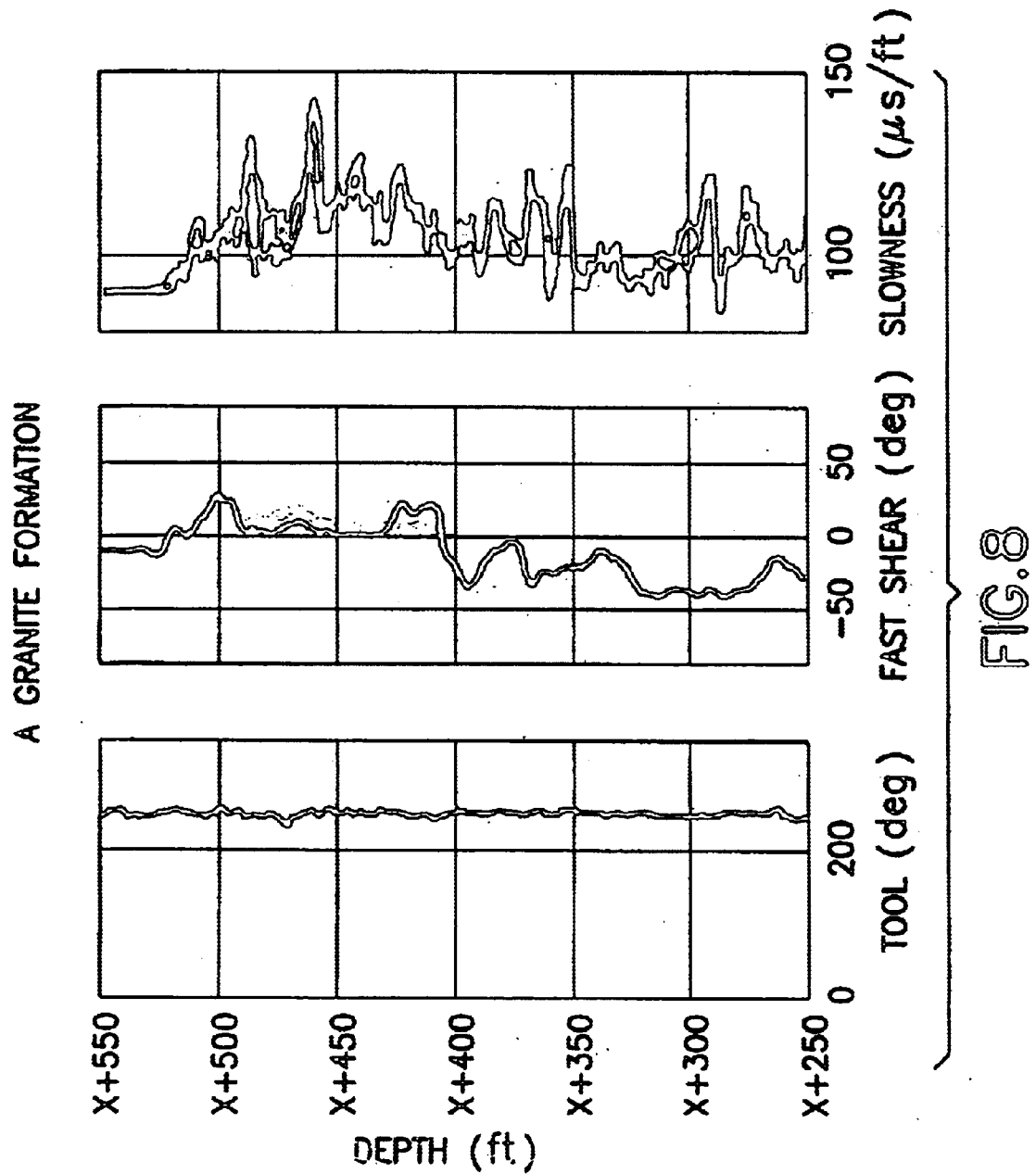
FIG. 8 shows dipole sonic logs in a granite formation. The first two panels show the tool azimuth and the fast shear directions, respectively. The third panel shows the fast and slow shear slownesses as a function of depth.
Figure 9:
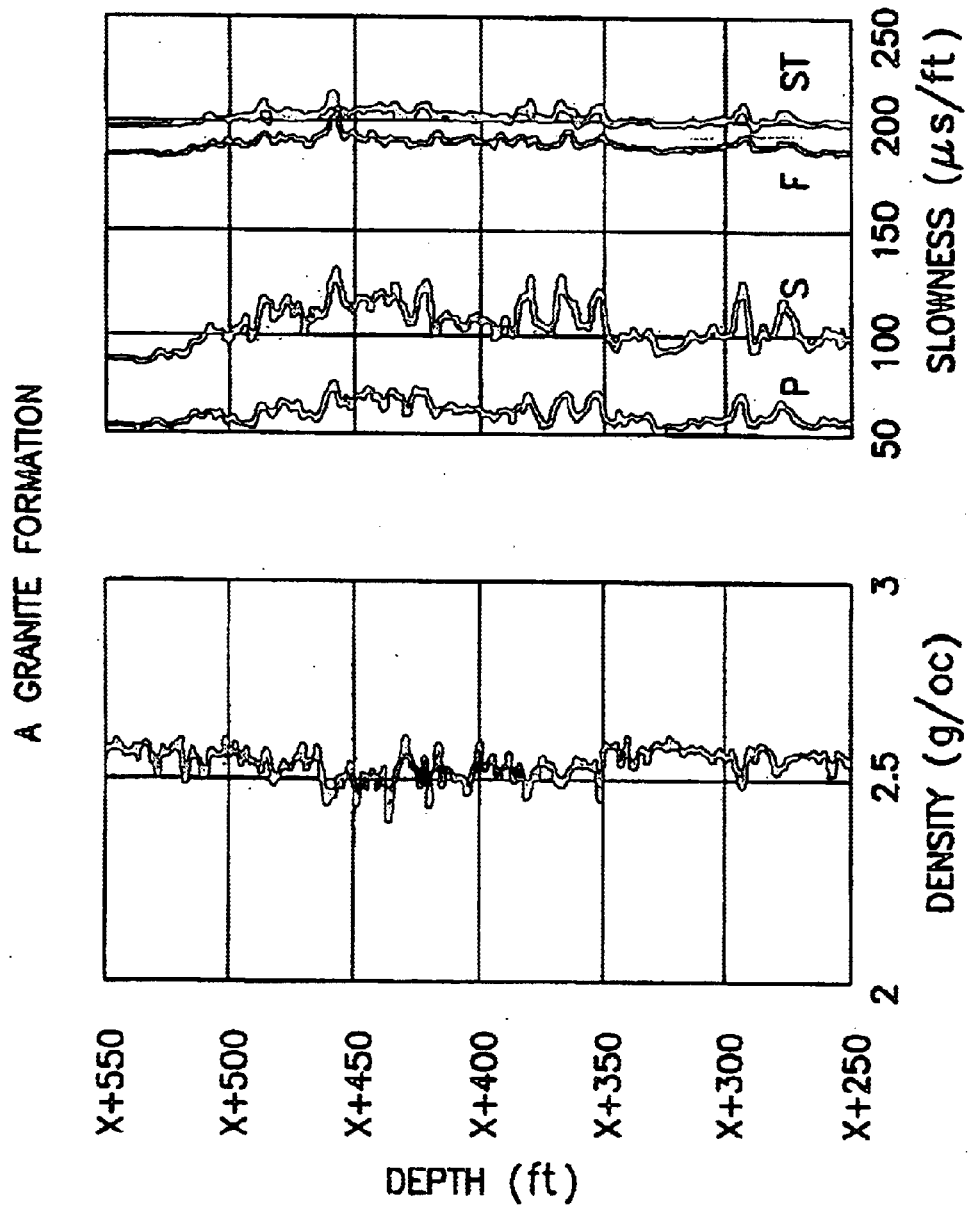
FIG. 9 shows dipole sonic logs in a granite formation. The first panel shows the formation mass density. The second panel shows the compressional (P) and shear (S) slownesses obtained by the P and S mode acquisition of a DSI tool. The borehole fluid (mud) and Stoneley slownesses estimated at 500 Hz are shown by the curves labeled F and ST, respectively.

FIG. 8 shows typical dipole sonic logs in a granite formation. The first two panels show the tool azimuth and the fast shear directions, respectively. The third panel shows the fast and slow shear slownesses, respectively. The first panel in FIG. 9 displays the density log. The second panel shows the compressional (C) and shear (S) logs from a high-frequency (center frequency 10 kHz) monopole source; the borehole fluid compressional slowness (F) and the Stoneley slowness (ST) estimated at 500 Hz. The third shear modulus $c_{66}$ can then be obtained from equation (56). Note that $\rho_f$ is the borehole fluid (mud) mass density; $V_f$ is the mud velocity; and $V_T$ is the tube wave velocity obtained from the low-frequency Stoneley mode of the DSI tool. The tube wave velocity is the zero frequency asymptote of the Stoneley dispersion. However, it is approximately the same as the actual Stoneley slowness measured at around 500 Hz. Note that $c_{66}$ is the equivalent shear modulus in the plane perpendicular to the borehole axis. The velocity of shear waves propagating along the $X_1$-direction with its polarization in the $X_2$-direction is expressed in terms of the shear modulus $c_{66}$.

The mud mass density is calculated from the mud weight used during the drilling process. The borehole fluid (mud) velocity was obtained by a cross plot of the apparent Stoneley slowness at 500 Hz and formation porosity. The apparent Stoneley slowness at zero porosity is taken to be the mud slowness ($S_f$).

Table I, shown in FIG. 10, contains estimates of the borehole fluid mass density $\rho_f$ and compressional slowness $S_f$; formation mass density $\rho_s$, compressional $S_P$ and shear $S_S$ slownesses in three different sections of the well. The compressional ($S_p$) and shear ($S_S$) slownesses were obtained by a monopole P and S mode acquisition (the transmitter center frequency being around 10 kHz) of the above-described type of tool From the Stoneley mode acquisition, the Stoneley slowness at 500 Hz has been calculated. The Stoneley slowness at 500 Hz is taken to be the tube wave slowness that has been listed in Table II (see FIG. 11) for the same depths shown in Table. I. The shear moduli $c_{44}$ and $c_{55}$ are obtained from the fast and slow shear slowness logs (FIGS. 8, 9), in conjunction with the formation mass density at those depths. The third shear modulus $c_{66}$ is obtained from the borehole fluid mass density $\rho_f$ and fluid compressional velocity $V_f$ together with the tube wave velocity $V_T$ as given by equation (4).

It is known in the prior art that the azimuthal shear anisotropy is defined by the difference between the shear moduli $c_{44}$ and $c_{55}$. As developed herein, the difference or the ratio of $c_{44}$ and $c_{66}$ is another measure of formation anisotropy that provides new information about the fractured or prestressed formation that are not obtainable by the dipole flexural logging of azimuthal shear anisotropy. Table II (in FIG. 11) summarizes the estimates of the three formation shear moduli as a function of depth. Note that a relatively larger ratio of $c_{44}/c_{66}$ is seen in the first and third sections of the well where the azimuthal shear anisotropy is also larger than the second section described in Tables I and II. This large ratio can be an indicator of formation anisotropy of orthorhombic or lower symmetry. Formation anisotropy of lower symmetry than orthorhombic arises in the presence of two fracture systems or aligned fractures obliquely inclined with respect to the borehole axes.

Next, consider applications of the three shear moduli. The difference between the fast and slow shear wave velocities (also referred to as the magnitude of shear anisotropy) is related to the transverse fracture compliance as described by Schoenberg and Sayers (1995).

$$c_{66} - c_{55} = \mu_b \delta_T, \quad (57)$$

where $\mu_b$ is the shear modulus of the background medium; $c_{66}$ and $c_{66}$ are the shear moduli that can be obtained from the Stoneley and flexural logging in a borehole with its axis parallel to the TI-symmetry, $X_3$-axis; $\delta_T$ is the transverse fracture compliance, $$0 \leq \delta_T = \frac{Z_T u_b}{1 + Z_T \mu_b} 1,$$

and fractures are in the $X_1$–$X_2$ plane. $Z_T = 4S_{55}$, is the tangential compliance of the fractured medium.

If all the three shear moduli $c_{44}$, $c_{55}$, and $c_{66}$ are significantly different, it implies that the surrounding formation consists of more than a single fracture system (that can be described by an orthorhombic system) or a single fracture system that is obliquely inclined with the borehole measurement axes. This sort of situation can certainly arise in the presence of a fault intersecting the borehole as seen in the above case of a granite formation.

In addition, seismic AVO analysis of anisotropic formation requires all the three shear moduli as part of the entire elastic anisotropic constants.

Figure 12:
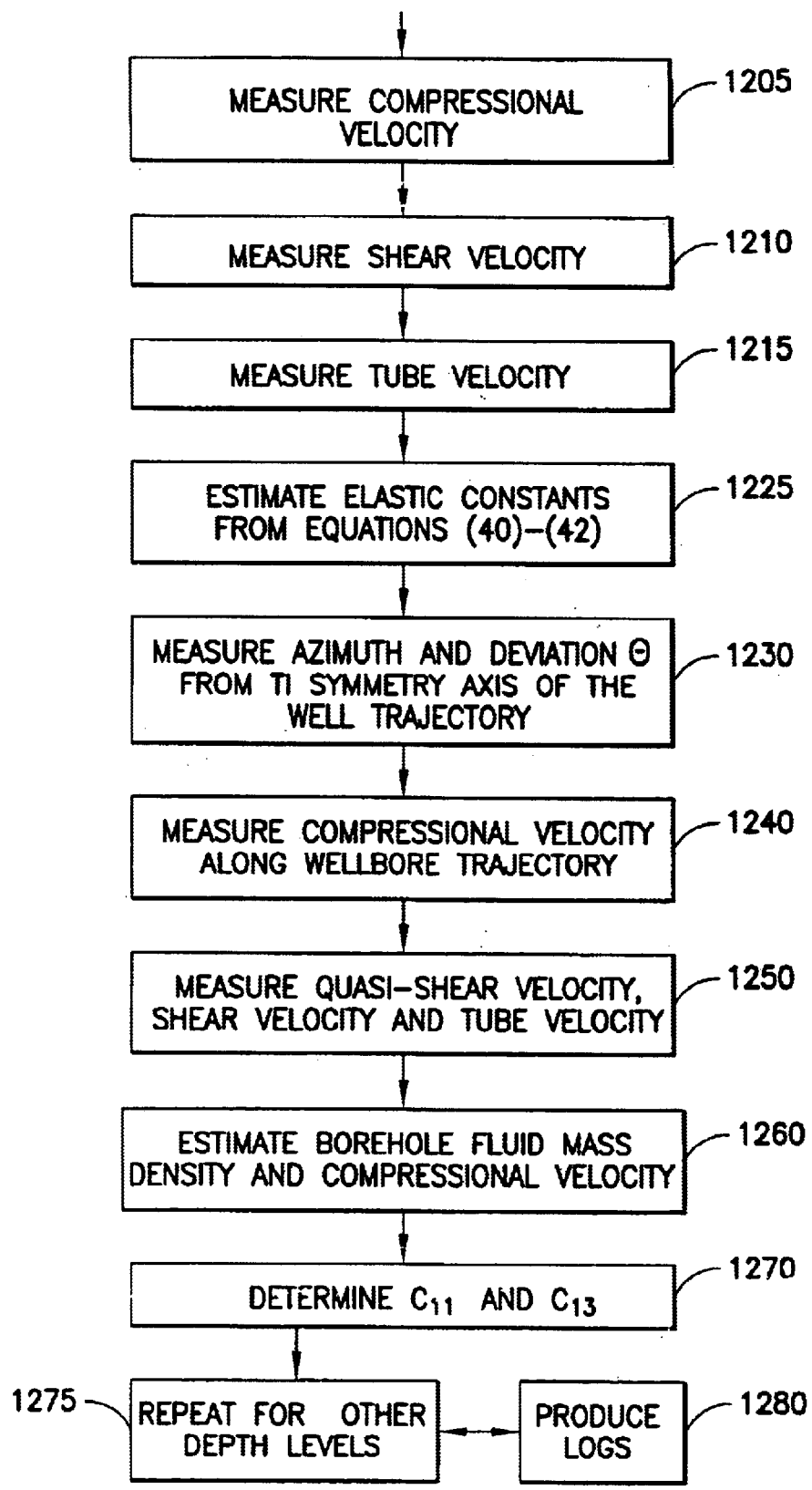
FIGS. 12 through 15 show flow diagrams of routines for programming a processor to implement various embodiments of the invention.

FIG. 12 is a flow diagram which can be used in programming a suitable processor, such as the processor 270 of the surface equipment of FIG. 1 or a remote processor, in practicing an embodiment of the invention. If desired, a downhole processor could also perform at least part of the technique. Data may, for example, be collected and stored using the type of logging apparatus described in conjunction with FIGS. 1–4, and other known equipment, although it will be understood that alternative suitable equipment can be utilized.

The blocks 1205, 1210 and 1215 respectively represent the measurement of compressional, shear, and tube wave (VT) velocities in substantially vertical section of the well. Then, as represented by the block 1225, the elastic coustants $c_{33}$, $c_{44}$, and $c_{66}$ are estimated from equations (40), (41) and (42). The azimuth $\phi$ and deviation $\theta$ from the vertical TI-symmetry axis is measured (block 1230) by a standard tool used for this purpose, such as "GPIT". [A wellbore survey is normally performed after the well has been drilled, and the wellbore deviation and azimuth are made available. Wellbore surveys are usually made either with a gyro or a measurement while drilling (MWD) survey using measurements of azimuth and inclination. The measurements themselves include inclination from vertical, and the azimuth (or compass heading) of the wellbore. These measurements are typically made at discrete points in the well, and the approximate path of the wellbore computed from the discrete points. Measurement devices range, for example, from simple pendulum-like devices to electronic accelerometers and gyroscopes.] Then, as represented by the block 1240, the formation compressional (qV-), quasi-shear (qSV-), and shear (SH-), and tube wave ($V_T$) velocities along the wellbore trajectory are measured, and the borehole fluid mass density ($\rho_f$) and compressional velocity ($V_f$) are estimated therefrom. In the deviation section of the well with a reasonably uniform deviation angle $\theta$, the formation compressional, shear and tube wave ($V_T$) velocities are measured (block 1250). The anisotropic parameter N is then estimated (block 1260) using equations (43) and (44), and the two remaining TI constants $c_{11}$ and $c_{13}$ are determined (block 1270) using equations (45), (46) and (47). The block 1275 represents repeating of the processing for other depth levels, and the block 1280 represents producing of suitable logs or graphs from the processed results. These last two blocks are also applicable to the further described routines.

Figure 13:
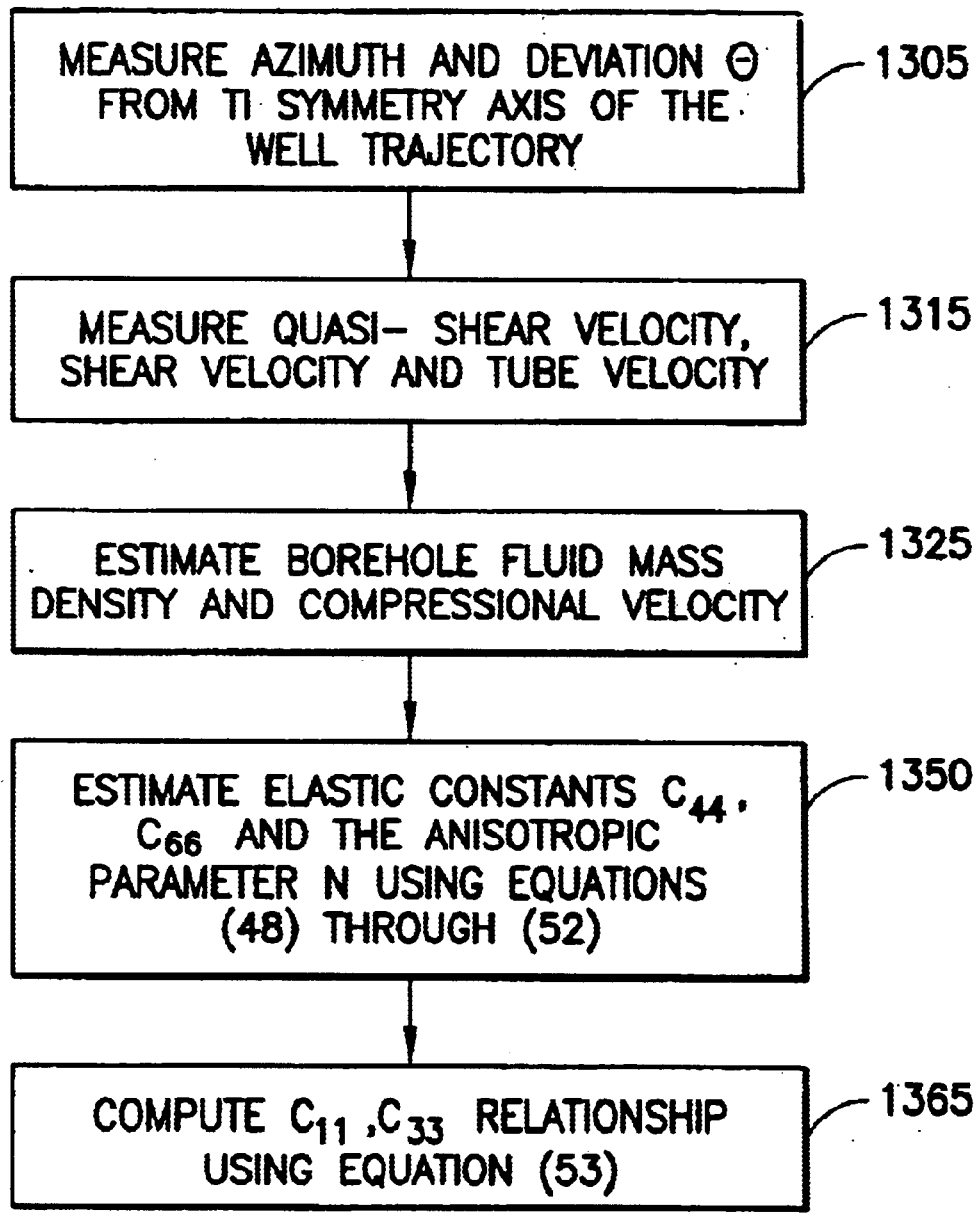

Referring to FIG. 13, there is shown a flow diagram of a routine for controlling a processor in implementing a further form of the invention whereby $c_{44}$, $c_{66}$ and two other anisotropic constants of a TI (e.g. shaly) region of the formations surrounding a deviated section of wellbore can be obtained using four sonic velocity measurements. The block 1305 represents measurement of the azimuth $\phi$ and deviation $\theta$ from the vertical TI symmetry axis of the well trajectory using a standard tool. The block 1315 represents measurement of the formation compressional (qV-), squasi-shear (qSV-), shear (SH-), and tube wave velocities along the wellbore trajectory. The borehole fluid mass density ($\rho_f$) and compressional velocity ($V_f$) in the deviated section are estimated (block 1325), and the elastic constants and the anisotropic parameter N are estimated (block 1350) from equations (48) through (52). Then, the relationship between $c_{11}$ and $c_{33}$ is obtained (block 1365) using the measured quasi-compressional velocity ($V_p$) and equation (53).

Figure 14A:
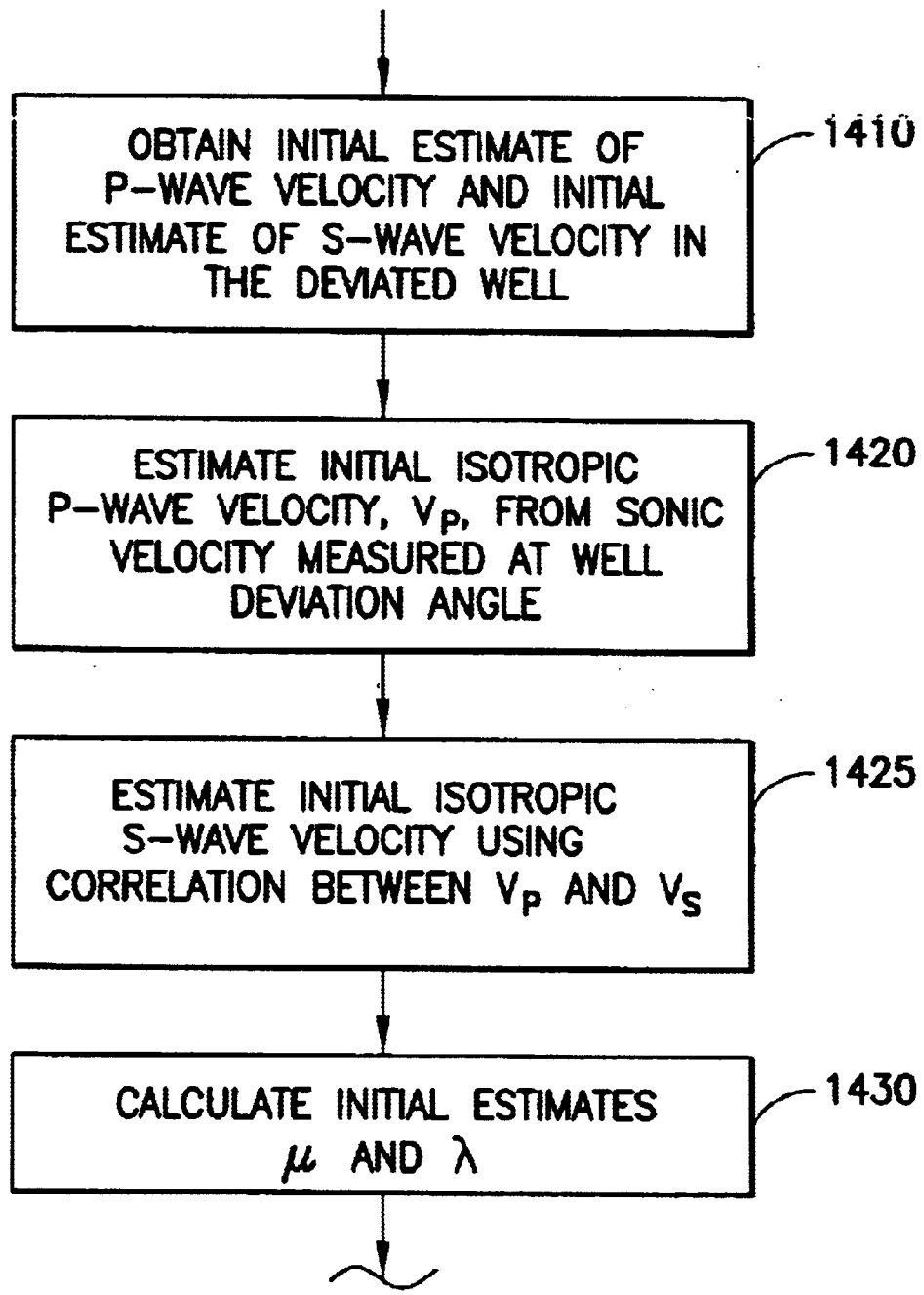
Figure 14B:
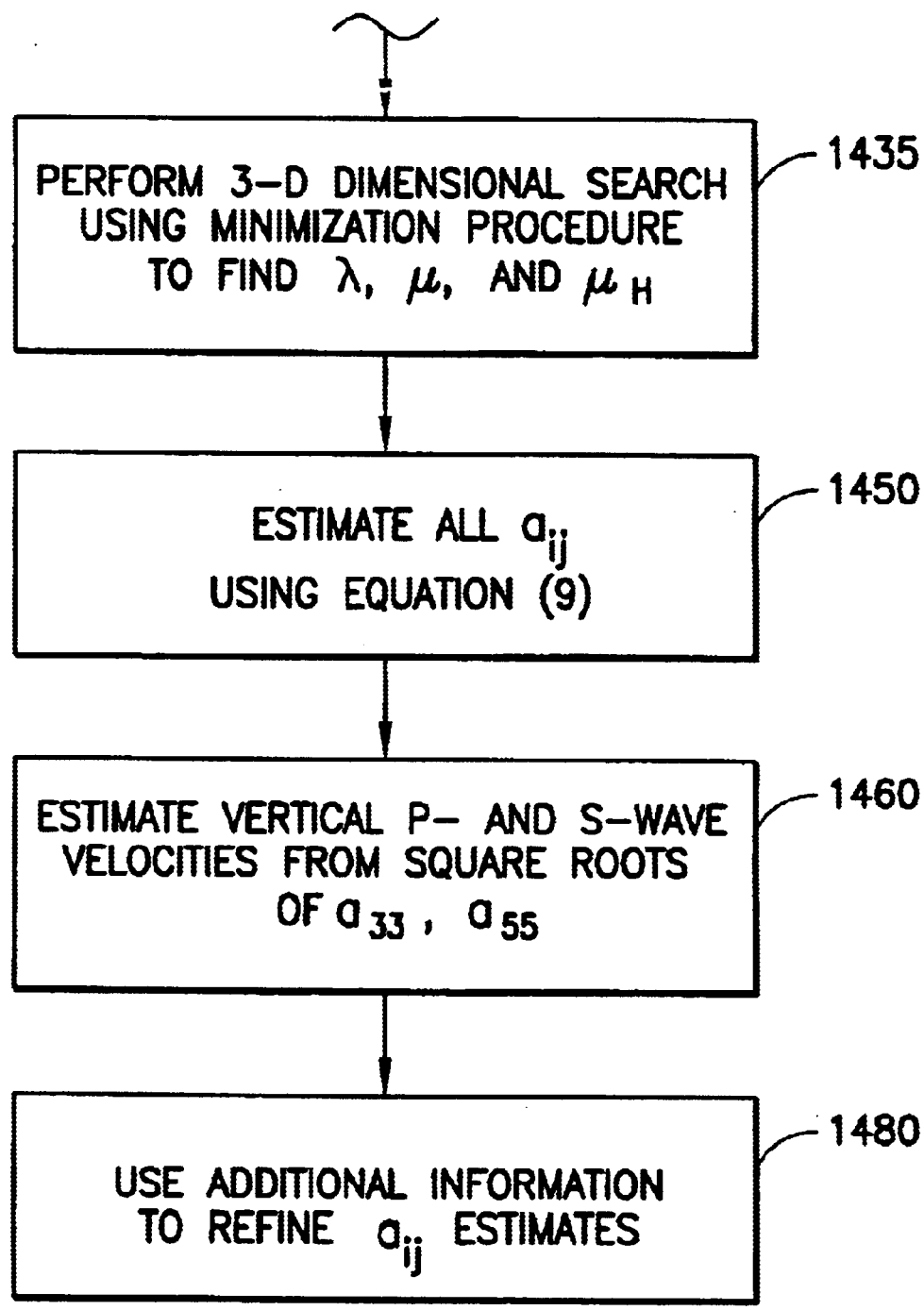

Referring to FIG. 14, there is shown a flow diagram of a routine for controlling a processor in implementing another form of the invention whereby when, in a deviated section of a well, with only three sonic velocities measured in such section, the three parameters $\lambda$, $\mu$, and $\mu_H$ can be obtained for a TI medium with vertical axis of symmetry. The block 1410 represents obtaining an initial estimate of P-wave velocity and an initial estimate of S-wave velocity. The block 1420 represents estimating, from the sonic velocity measured at the well deviation angle, the initial isotropic P-wave velocity. An initial isotropic S-wave velocity is then estimated (block 1425) using correlation between $V_p$ and $V_s$. Initial estimates of $\mu$ and $\lambda$ are then calculated, as represented by the block 1430. A three-dimensional search is then performed (block 1435), using a minimization procedure as previously described, and all the $a_{ij}$ are estimated (block 1450) using equation (9). Then, the vertical P- and S-wave velocities can be estimated (block 1460) using the square roots of $a_{33}$ and $a_{55}$, respectively. Also, as previously described, any additional information can be employed to refine the $a_{ij}$ estimates using perturbation theory (block 1480).

Figure 15A:
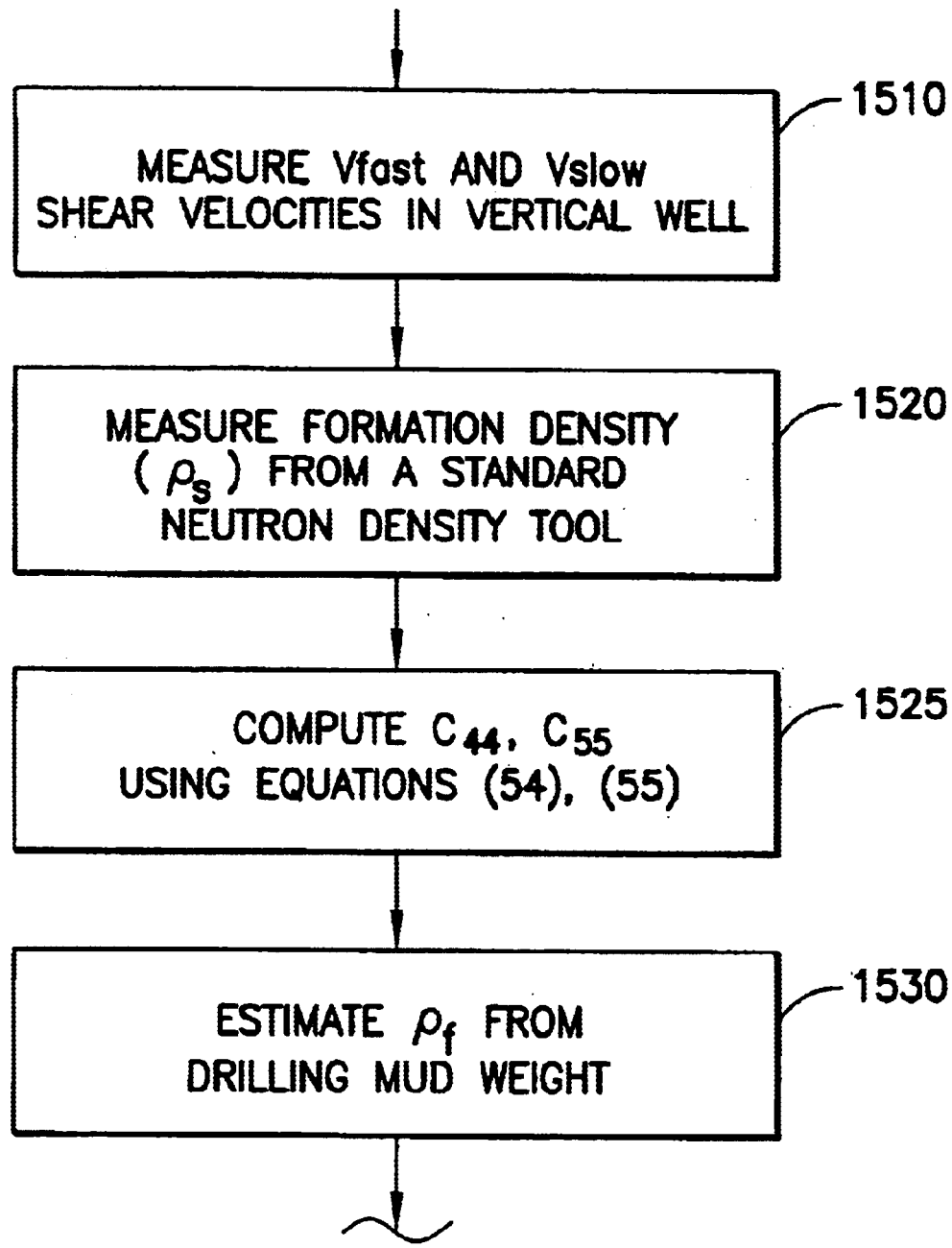
Figure 15B:
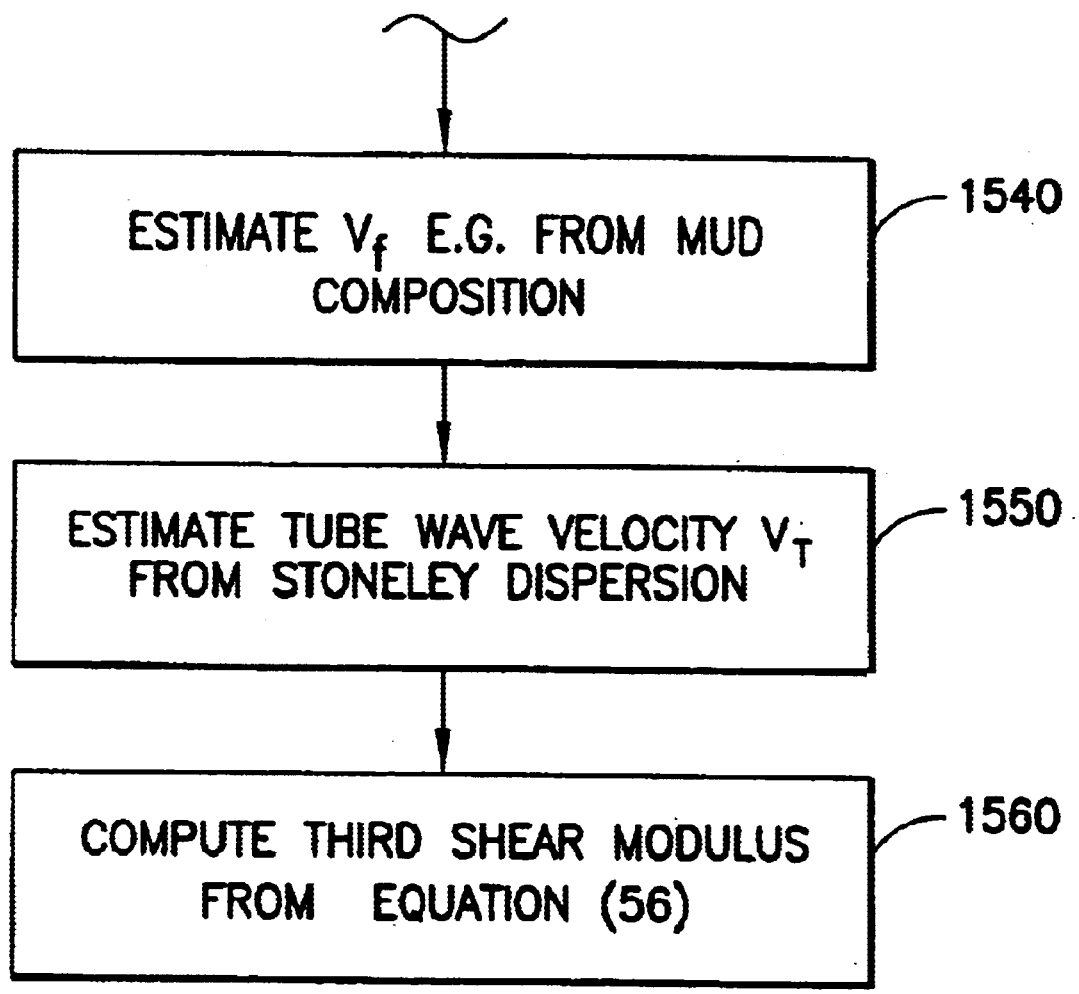

Referring to FIG. 15, there is shown a flow diagram of a routine for controlling a processor in implementing a still further form of the invention whereby a technique is set forth for estimating the three shear moduli in an orthorhombic formation. The block 1510 represents the measuring of the fast ($V_{fast}$) and slow ($V_{slow}$) shear velocities of the formation with a dipole sonic tool in a vertical well. The formation mass density ($\rho_s$) is estimated from a standard neutron density tool (block 1520), and the two shear moduli in the orthogonal sagittal planes of the measurement are computed (block 1525) using equations (54) and (55). The borehole fluid mass density ($\rho_f$) is estimated (block 1530) from drilling mud weight, and the borehole fluid compressional velocity is estimated (block 1540), e.g. from the mud composition. Then, the block 1550 represents estimation of the tube wave velocity ($V_T$) from the zero frequency asymptote of the Stoneley dispersion. The third shear modulus can then be computed (block 1560) using equation (56).

The invention has been described with reference to particular preferred embodiments, but variations within the spirit and scope of the invention will occur to those skilled in the art. For example, it will be understood that the type of seismic data obtained and processed in the description of U.S. Pat. No. 6,067,275, can be employed as inputs in embodiments of the present invention. Also, it will be understood that while a perturbative approach has been set forth in an exemplary embodiment of the invention, other techniques, such as iterative techniques, could be employed. Suitable alternative initial models could also be used.

What is claimed is:

1. A method for determining properties of a transverse isotropic region of earth formations traversed by a wellbore having substantially vertical and deviated sections therethrough, comprising the steps of:

measuring sonic velocity properties in formations surrounding the substantially vertical section of said wellbore;

measuring sonic velocity properties in formations surrounding the deviated section of said wellbore; and determining, from the measured velocities in said substantially vertical and deviated sections of the formations, all of the transverse isotropic elastic constants of said region.

2. The method as defined by claim 1, wherein said step of measuring sonic velocity properties in formations surrounding the substantially vertical section of the wellbore includes measuring compressional, shear, and tube wave velocities of said formations.

3. The method as defined by claim 2, further comprising the step of estimating the elastic constants $c_{33}$, $c_{44}$, $c_{66}$ from said measured compressional, shear, and tube wave velocities measured in the substantially vertical section of the wellbore.

4. The method as defined by claim 3, wherein said step of measuring sonic velocity properties in formations surrounding the deviated section of the wellbore includes measuring the shear, quasi-shear, and tube wave velocities in formations surrounding the deviated section of the wellbore.

5. The method as defined by claim 4, further comprising the step of determining the azimuth $\phi$ deviation $\theta$ from the transverse isotropic axis of the wellbore trajectory in the deviated section of said well bore, and wherein said determination of elastic constants of said shaly region is also a function of said azimuth $\phi$ and deviation $\theta$.

6. The method as defined by claim 1, further comprising the step of determining the wellbore fluid mass density and compressional velocity, and wherein said determination of elastic constants of said shaly region is also a function of said wellbore fluid mass density and compressional velocity.

7. The method as defined by claim 1, wherein said transverse isotropic elastic constants include $c_{11}$, $c_{13}$, $c_{33}$, $c_{44}$, and $c_{66}$.

8. The method as defined by claim 1 wherein said formations are also traversed by a further wellbore having a section with a deviation different than the deviation of the deviated section of said first mentioned wellbore, and further comprising the step of measuring sonic velocity properties in formations surrounding the deviated section of said further wellbore, and wherein said determining step includes determining all of the transverse isotropic elastic constants from said measurements in said further wellbore as well as from said measurements in said first-mentioned wellbore.

9. The method as defined by claim 5, wherein said determining step employs a perturbation technique.

10. A method for determining properties of a transverse isotropic region of earth formations traversed by a wellbore having a deviated section therethrough, comprising the steps of:

measuring sonic velocity properties in formations surrounding said deviated section of said wellbore;

determining the ratio of axial to radial components of polarization associated with quasi-compressional or quasi-shear waves in formations surrounding said deviated section of said wellbore; and determining, from the measured velocities and said determined ratio in said deviated sections of the formations, all of the transverse isotropic elastic constants of said region.

11. The method as defined by claim 10, further comprising the step of determining the wellbore fluid mass density and compressional velocity, and wherein said determination of elastic constants of said shaly region is also a function of said wellbore fluid mass density and compressional velocity.

12. The method as defined by claim 10, wherein said transverse isotropic elastic constants include $c_{11}$, $c_{13}$, $c_{33}$, $c_{44}$, and $c_{66}$.

13. A method for determining properties of a region of earth formations that is transverse isotropic, traversed by a wellbore having a substantially deviated section therethrough, comprising the steps of:

measuring compressional velocity in formations surrounding said substantially deviated section of wellbore;

measuring two orthogonally polarized shear velocities in said formations surrounding said substantially deviated section of wellbore; and determining three elastic parameters of the formations surrounding said substantially deviated section of wellbore.

14. The method as defined by claim 13, wherein said formations are also traversed by a further wellbore having a section with a deviation different than the deviation of the deviated section of said first mentioned wellbore, and further comprising the step of measuring sonic velocity properties in formations surrounding the deviated section of said further wellbore, and wherein said determining step includes determining all of the transverse isotropic elastic constants from said measurements in said further wellbore as well as from said measurements in said first-mentioned wellbore.

15. The method as defined by claim 13, wherein said determining step employs a perturbation technique.

16. The method as defined by claim 13, employed in a region of earth formations that is transverse isotropic, with vertical axis of symmetry.

17. A method for determining properties of a region of earth formations having orthorhombic or monoclinic symmetry with respect to a wellbore traversing said region of formations, comprising the steps of:

measuring two orthogonally polarized shear velocities in formations surrounding said wellbore in said region;

measuring the tube wave velocity in formations surrounding said wellbore in said region; and determining, from said measured shear velocities and tube wave velocity, three shear moduli referred to the wellbore axis, of said region of formations.

18. The method as defined by claim 12, further comprising the step of determining formation mass density in said region, and wherein said determining step implements said determination from said mass density as well as said measured shear and tube wave velocities.

19. The method as defined by claim 18, wherein said determining step employs a perturbation technique.

20. Apparatus for determining properties of a transverse isotropic region of earth formations traversed by a wellbore having substantially vertical and deviated sections therethrough, comprising:

means for measuring sonic velocity properties in formations surrounding the substantially vertical section of said wellbore;

means for measuring sonic velocity properties in formations surrounding the deviated section of said wellbore; and means for determining, from the measured velocities in said substantially vertical and deviated sections of the formations, all of the transverse isotropic elastic constants of said region.

21. Apparatus as defined by claim 20, wherein said means for measuring sonic velocity properties in formations surrounding the substantially vertical section of the wellbore includes means for measuring compressional, shear, and tube wave velocities of said formations.

* * * * *